Figure 1:
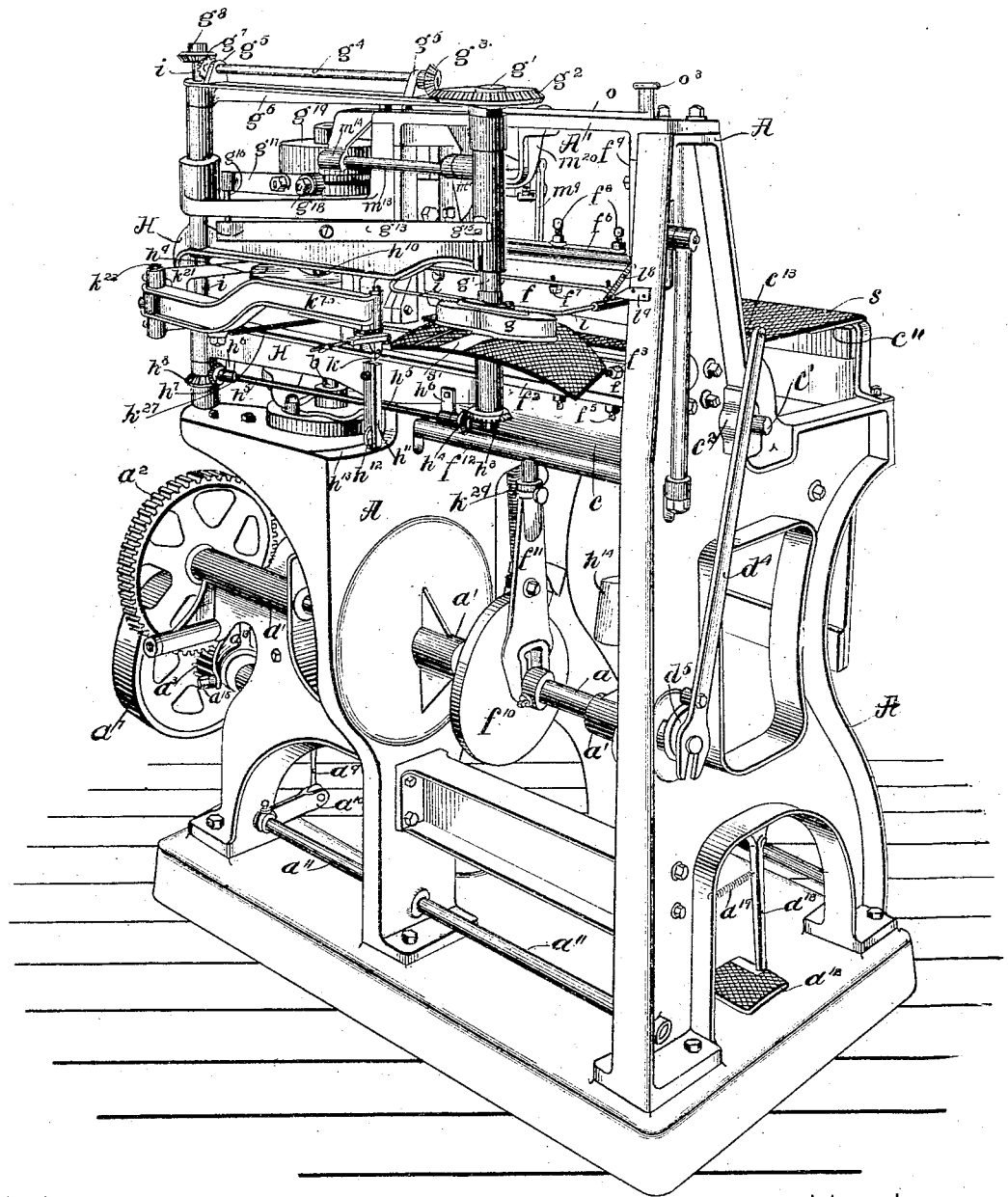

(No Model.) 19 Sheets—Sheet 1.

C. S. GOODING & V. BEAUREGARD.
MACHINE FOR CUTTING BOOT OR SHOE SOLES, &c., FROM SHEET MATERIAL.

No. 593,537. Patented Nov. 9, 1897.

Fig-1-

Witnesses
Odie B. Roberts
Thomas J. Cunningham

Inventors
Charles S. Gooding
and Victor Beauregard
by their Attorney,
Reuben L. Roberts.

(No Model.) 19 Sheets—Sheet 3.
C. S. GOODING & V. BEAUREGARD.
MACHINE FOR CUTTING BOOT OR SHOE SOLES, &c., FROM SHEET MATERIAL.
No. 593,537. Patented Nov. 9, 1897.
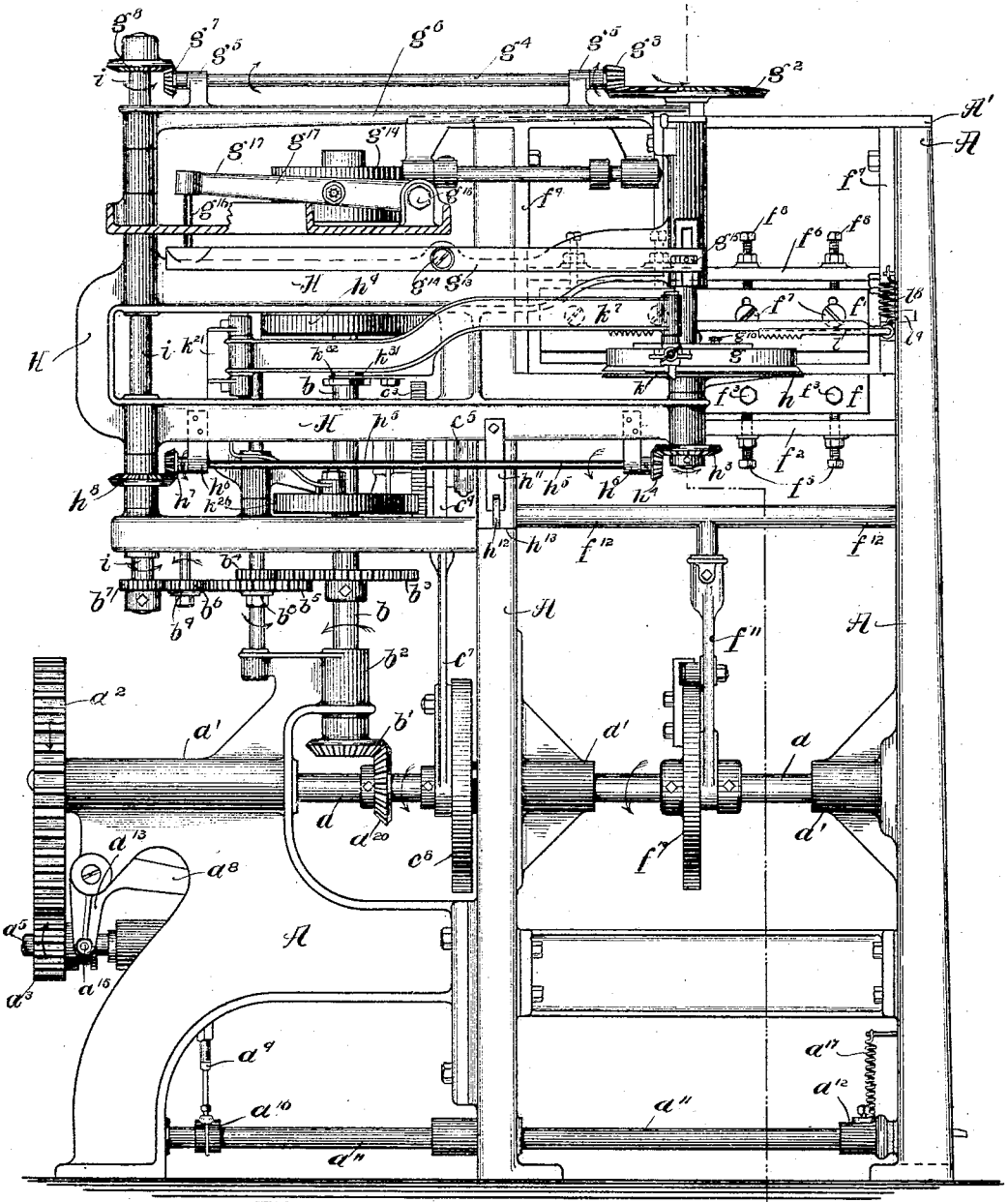
Fig. 3
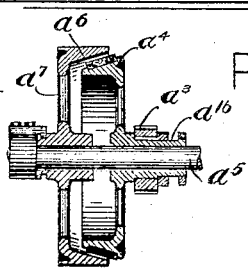
Fig. 3ª
WITNESSES—
Odin B. Roberts
Thomas J. Cunningham
INVENTORS—
Charles S. Gooding
and Victor Beauregard
by their Attorney,
Reuben L. Roberts.

(No Model.) 19 Sheets—Sheet 4.

C. S. GOODING & V. BEAUREGARD.
MACHINE FOR CUTTING BOOT OR SHOE SOLES, &c., FROM SHEET MATERIAL.

No. 593,537. Patented Nov. 9, 1897.

Fig-4-

Witnesses
Odie B. Roberts
Thomas J. Cunningham.

Inventors.
Charles S. Gooding
and Victor Beauregard
by their Attorney
Reuben L. Roberts.

(No Model.)     19 Sheets—Sheet 5.

C. S. GOODING & V. BEAUREGARD.
MACHINE FOR CUTTING BOOT OR SHOE SOLES, &c., FROM SHEET MATERIAL.

No. 593,537.     Patented Nov. 9, 1897.

WITNESSES.
Odin B. Roberts
Thomas J. Cunningham

INVENTORS:
Charles S. Gooding
and Victor Beauregard
by their Attorney,
Reuben L. Roberts.

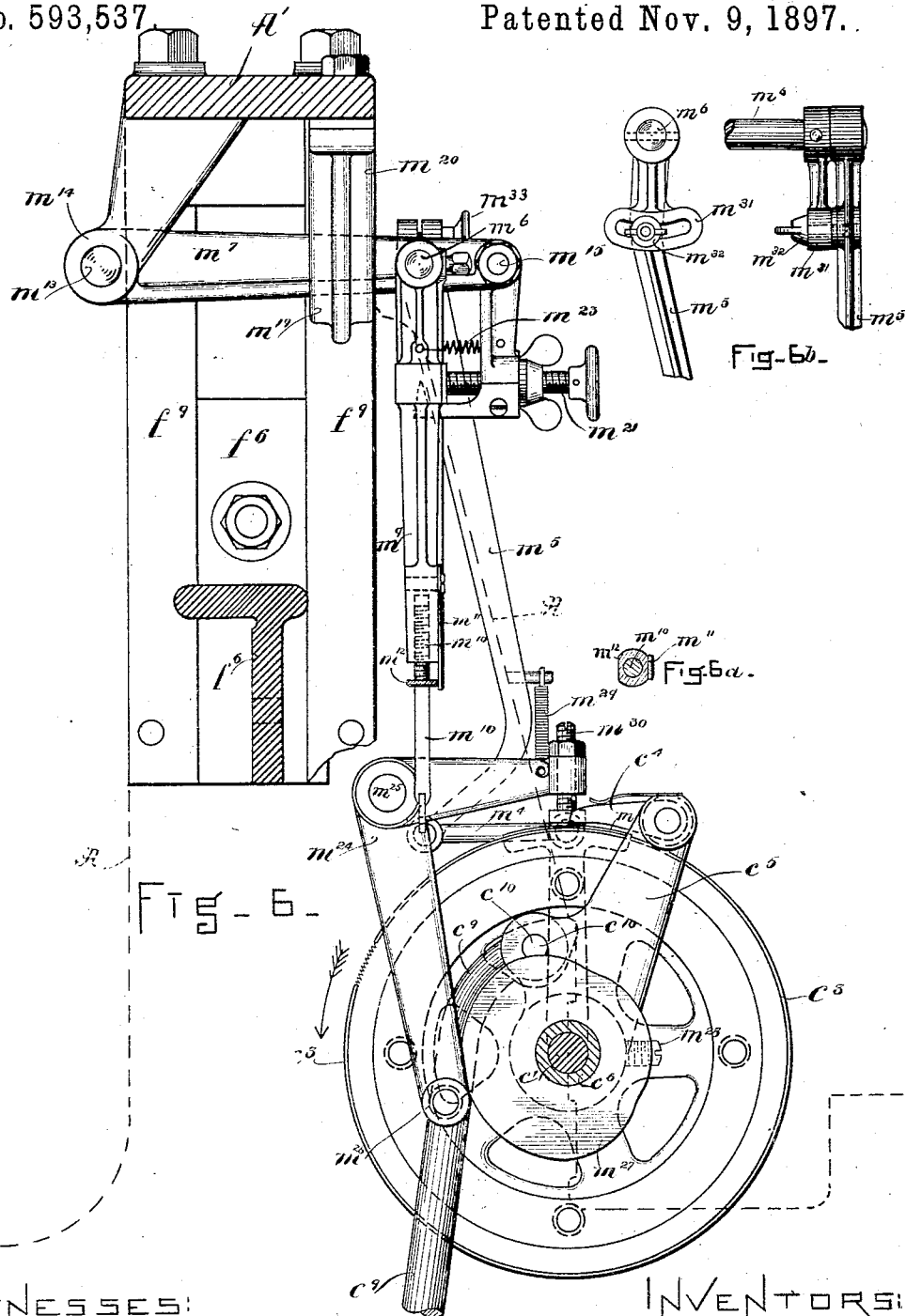

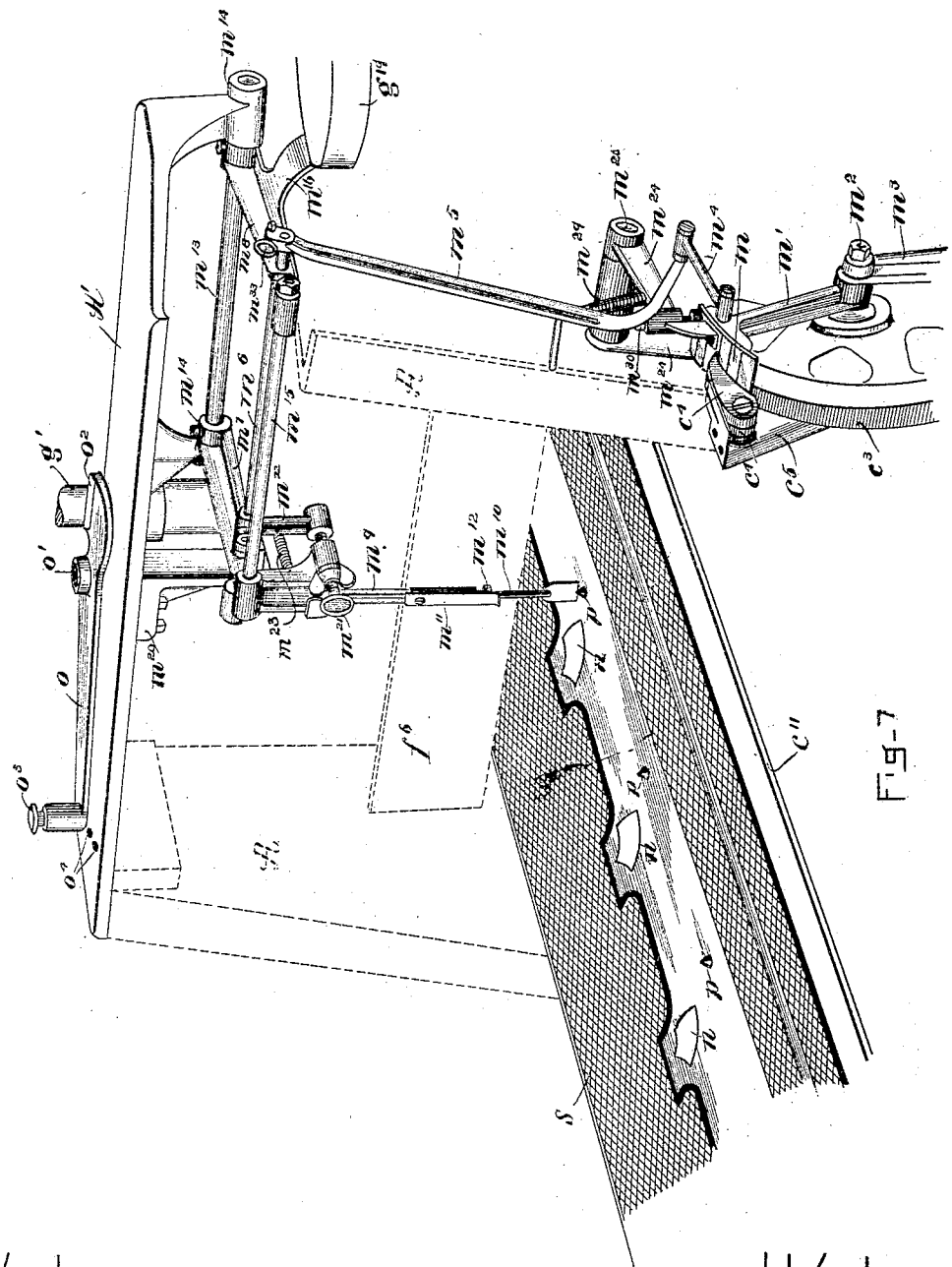

(No Model.) 19 Sheets—Sheet 8.

C. S. GOODING & V. BEAUREGARD.
MACHINE FOR CUTTING BOOT OR SHOE SOLES, &c., FROM SHEET MATERIAL.

No. 593,537. Patented Nov. 9, 1897.

WITNESSES:
Edie B. Roberts
Thomas J. Cunningham.

INVENTORS:
Charles S. Gooding
and Victor Beauregard
by their Attorney, Reuben L. Roberts.

(No Model.)
19 Sheets—Sheet 9.
C. S. GOODING & V. BEAUREGARD.
MACHINE FOR CUTTING BOOT OR SHOE SOLES, &c., FROM SHEET MATERIAL.
No. 593,537.
Patented Nov. 9, 1897.
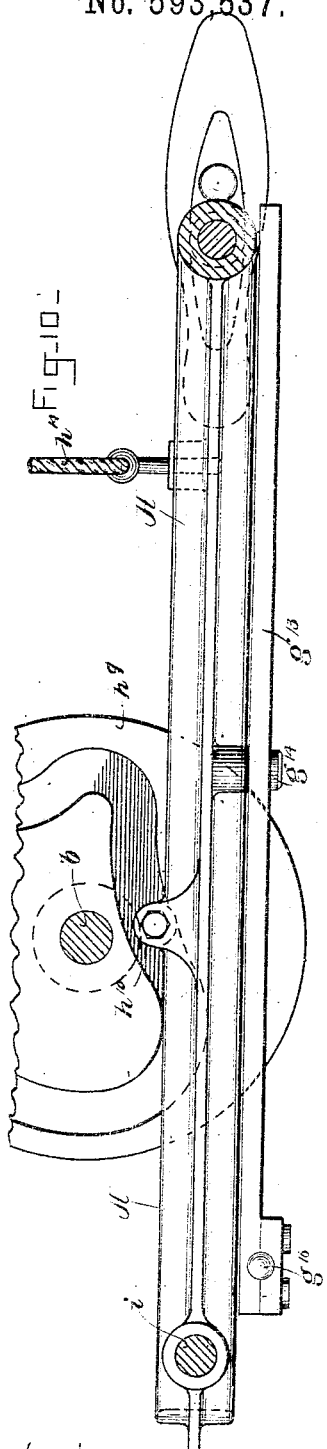
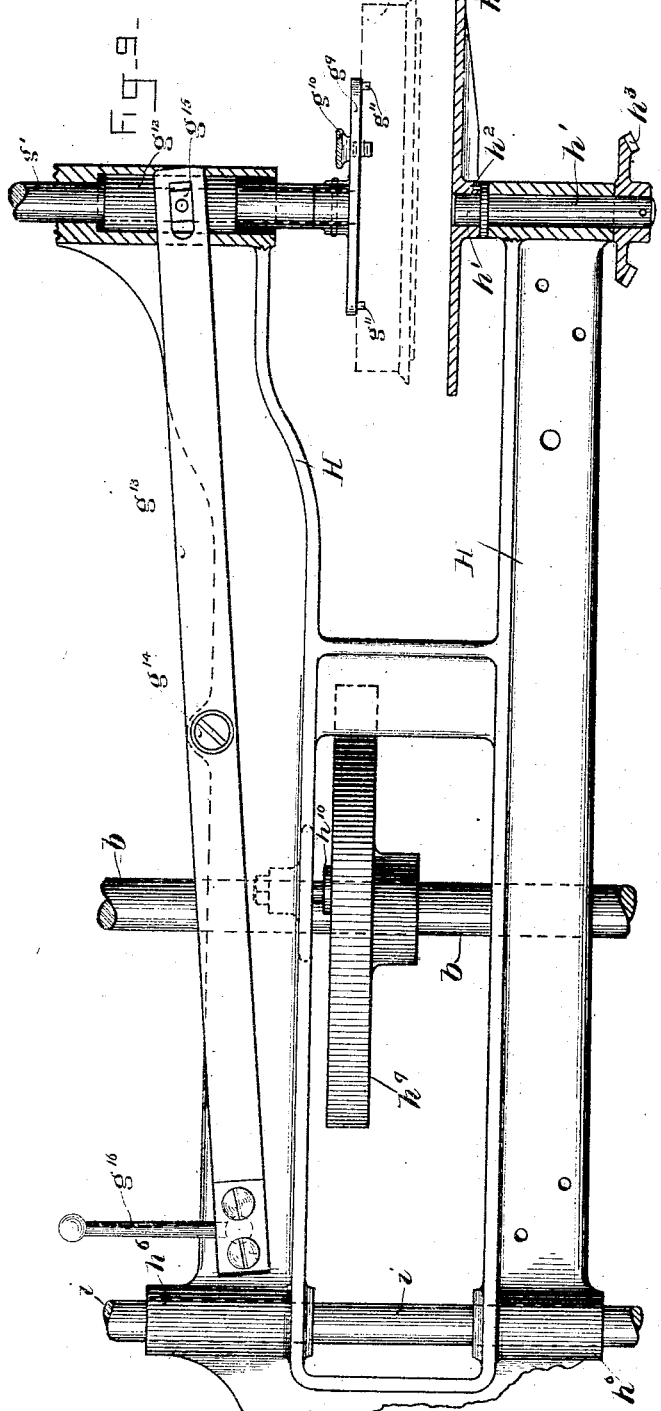
WITNESSES
Odie B. Roberts
Thomas J. Cunningham
INVENTORS
Charles S. Gooding and Victor Beauregard
by their Attorney
Reuben L. Roberts

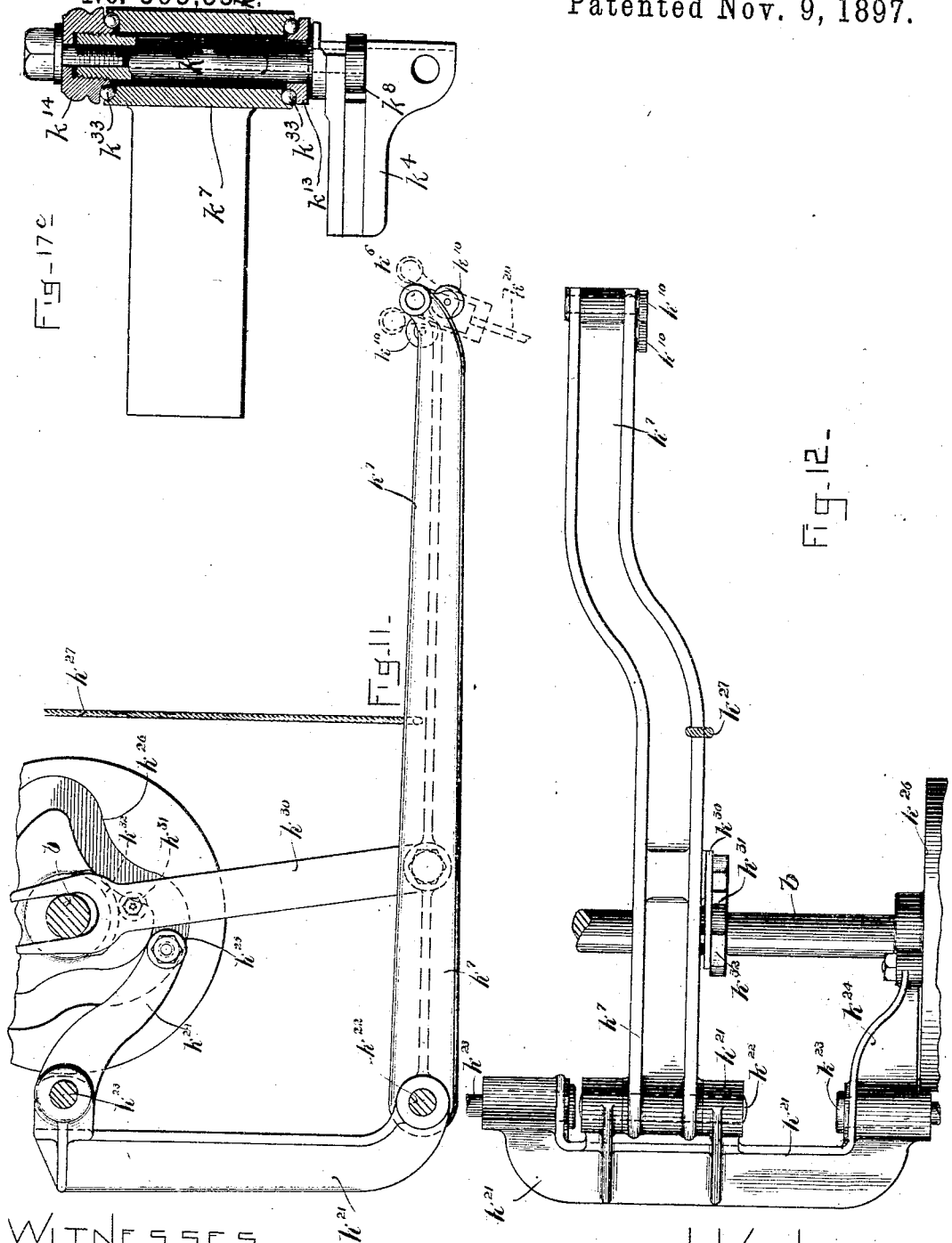

(No Model.)  19 Sheets—Sheet 11.
C. S. GOODING & V. BEAUREGARD.
MACHINE FOR CUTTING BOOT OR SHOE SOLES, &c., FROM SHEET MATERIAL.
No. 593,537. Patented Nov. 9, 1897.
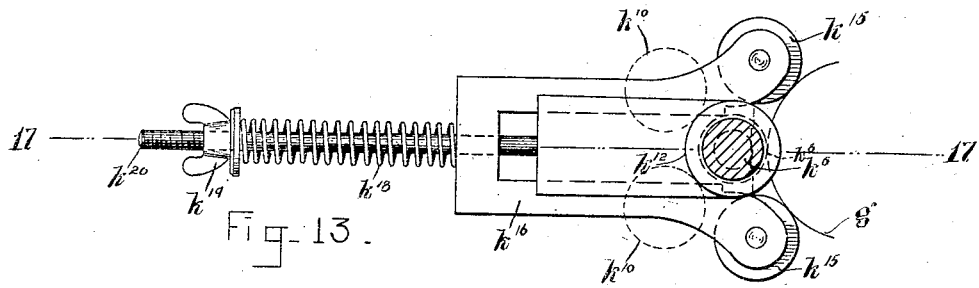
Fig. 13.
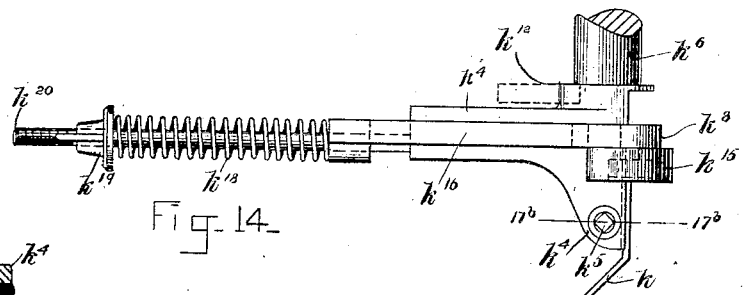
Fig. 14.
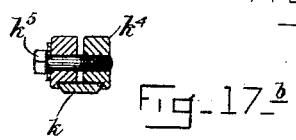
Fig. 17ᵇ.
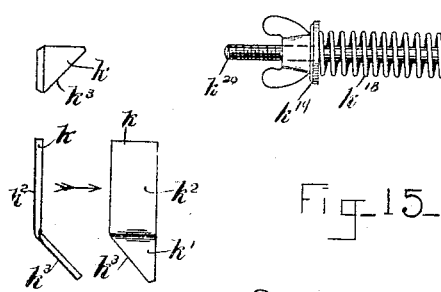
Fig. 15.
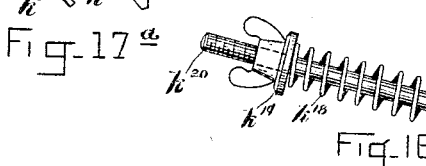
Fig. 17ᵃ.
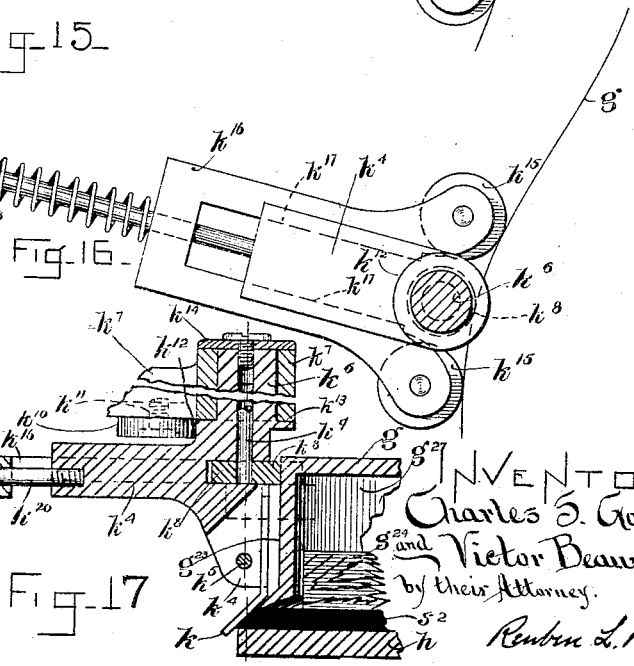
Fig. 16.
Fig. 17.
WITNESSES
Odin B. Roberts
Thomas J. Cunningham
INVENTORS
Charles S. Gooding
and Victor Beauregard
by their Attorney
Reuben L. Roberts

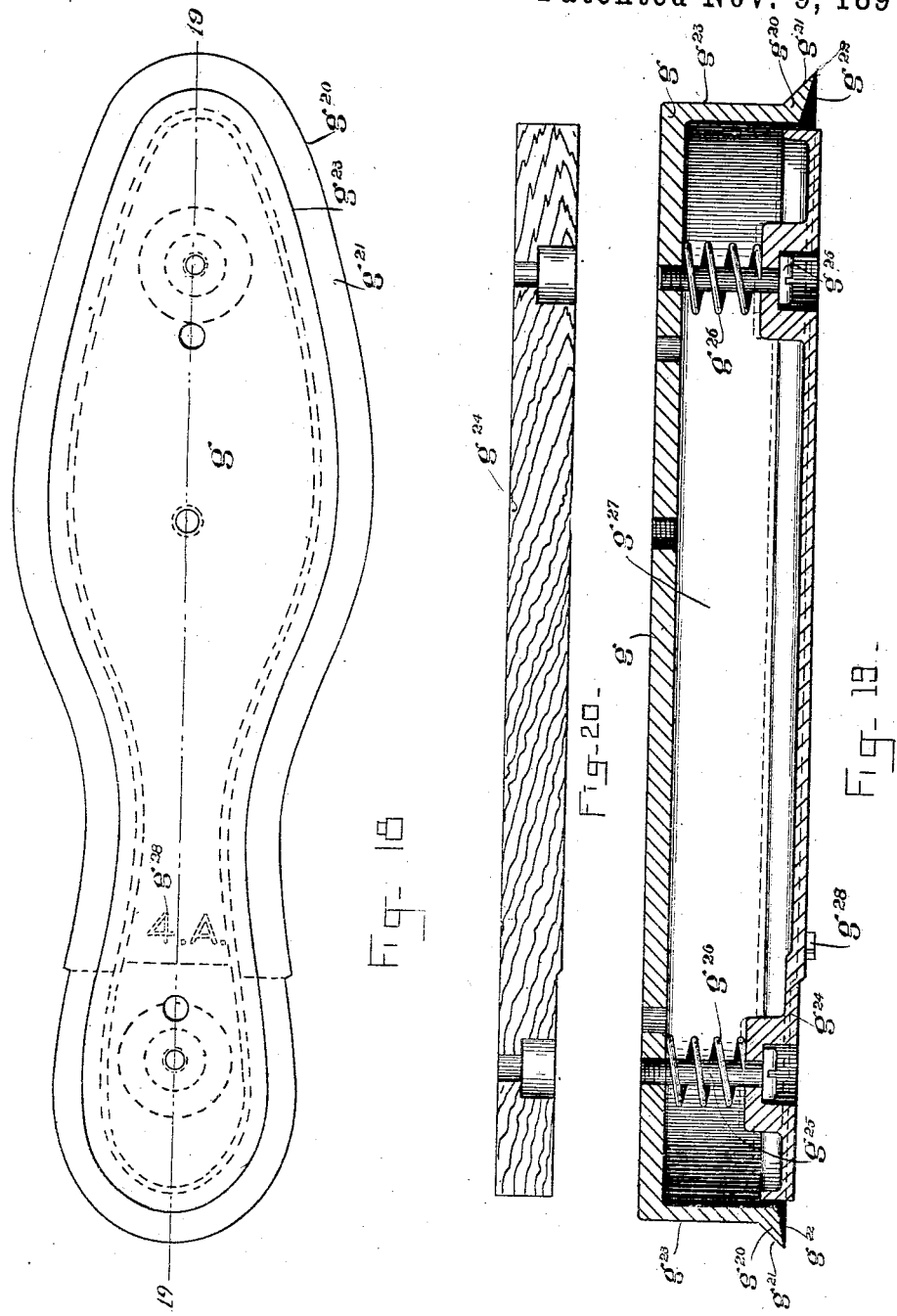

(No Model.) 19 Sheets—Sheet 13.
C. S. GOODING & V. BEAUREGARD.
MACHINE FOR CUTTING BOOT OR SHOE SOLES, &c., FROM SHEET MATERIAL.
No. 593,537. Patented Nov. 9, 1897.
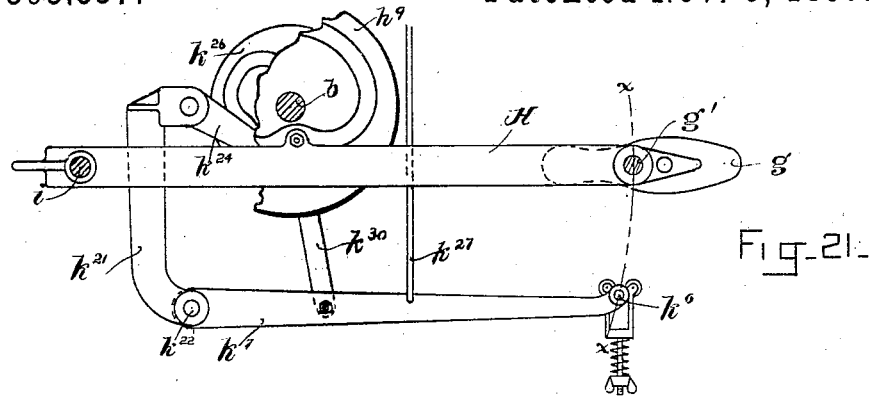
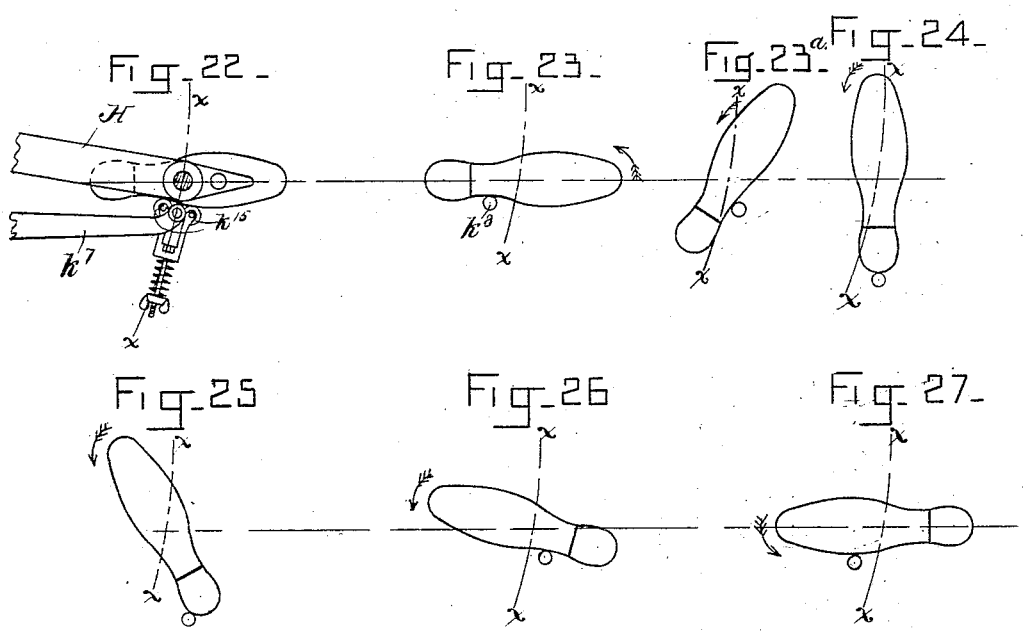
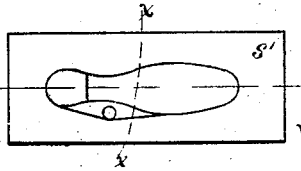
WITNESSES:
INVENTORS:
Charles S. Gooding
and Victor Beauregard
by their Attorney,
Reuben L. Roberts.

(No Model.) 19 Sheets—Sheet 14.
C. S. GOODING & V. BEAUREGARD.
MACHINE FOR CUTTING BOOT OR SHOE SOLES, &c., FROM SHEET MATERIAL.
No. 593,537. Patented Nov. 9, 1897.
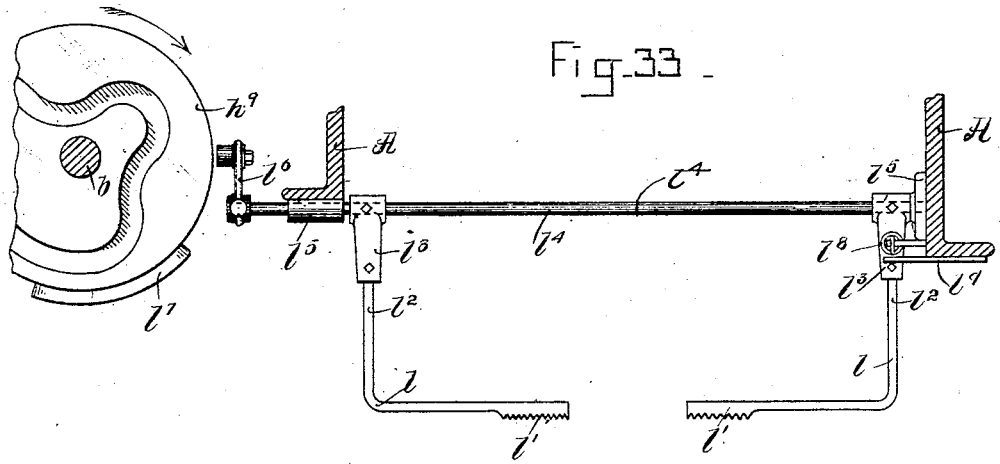
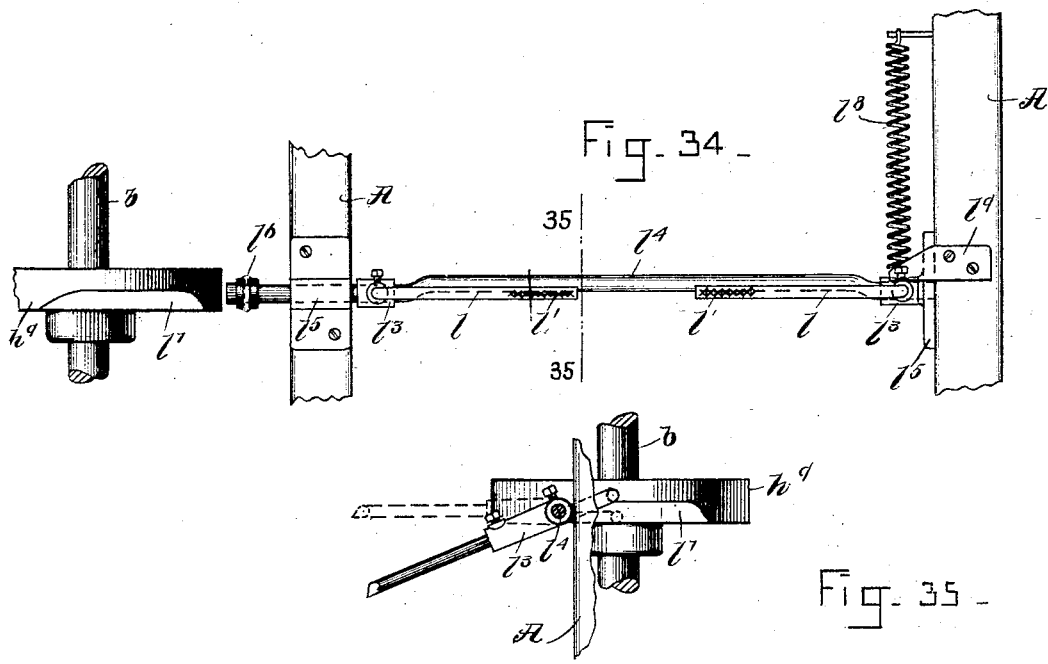

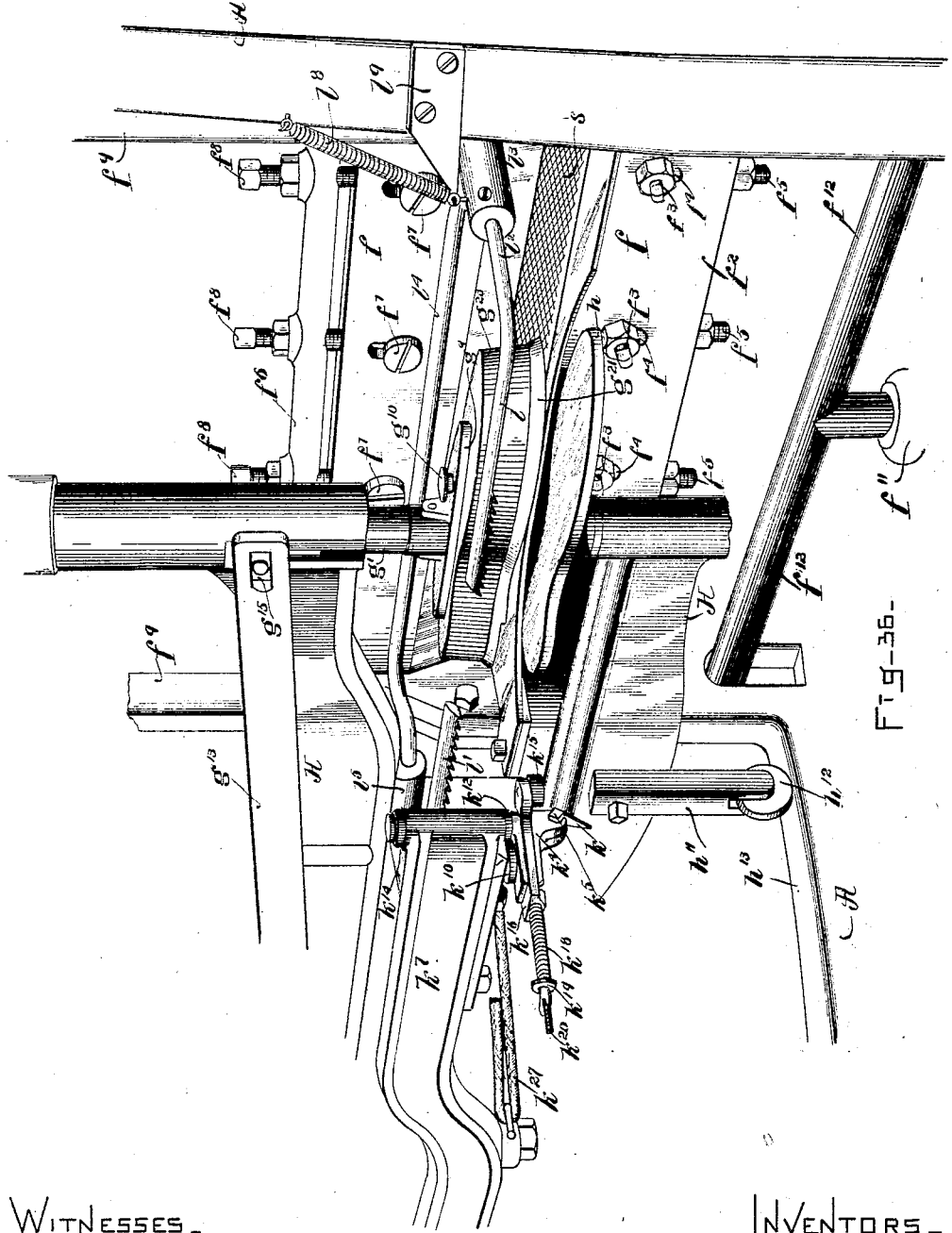

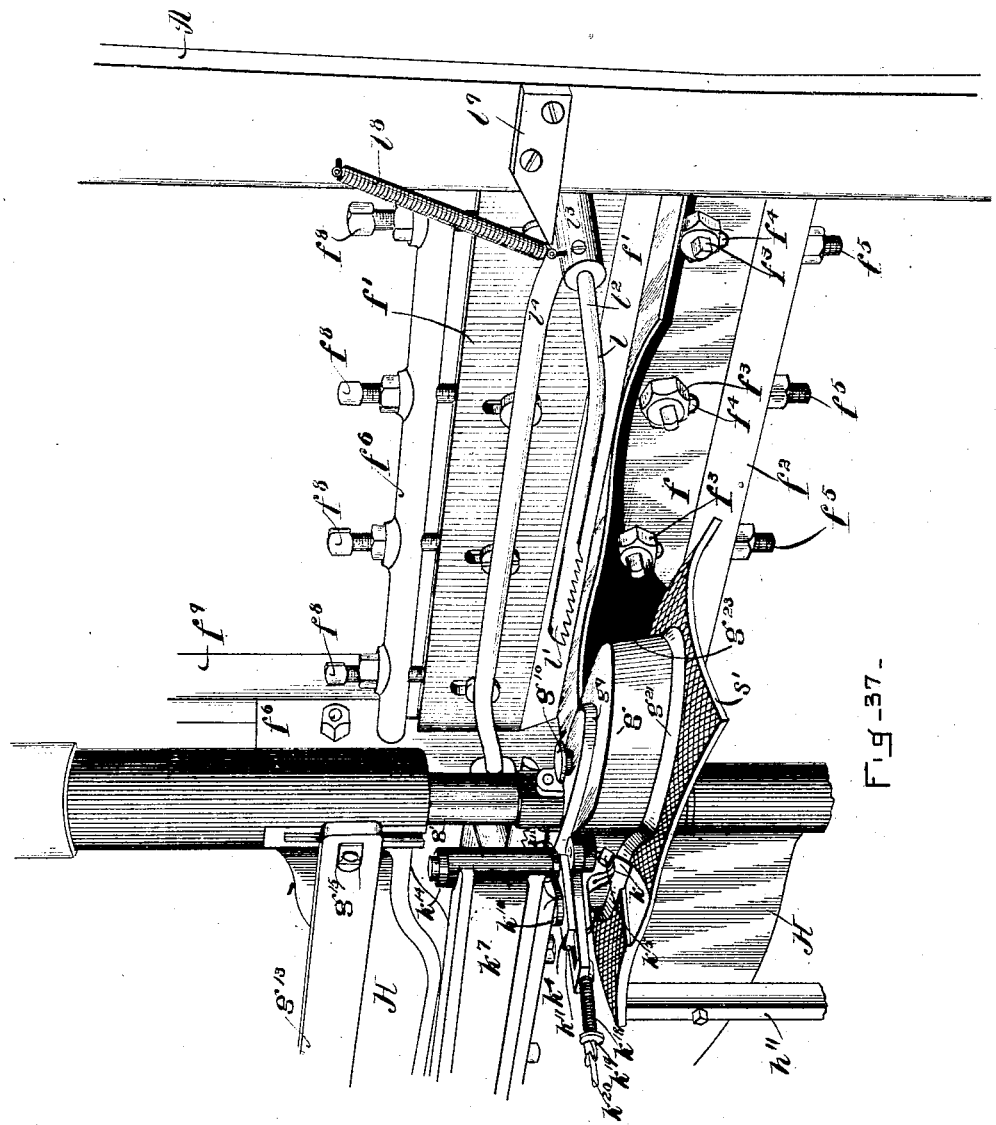
(No Model.) 19 Sheets—Sheet 16.
C. S. GOODING & V. BEAUREGARD.
MACHINE FOR CUTTING BOOT OR SHOE SOLES, &c., FROM SHEET MATERIAL.
No. 593,537. Patented Nov. 9, 1897.

(No Model.) 19 Sheets—Sheet 17.
C. S. GOODING & V. BEAUREGARD.
MACHINE FOR CUTTING BOOT OR SHOE SOLES, &c., FROM SHEET MATERIAL.
No. 593,537. Patented Nov. 9, 1897.

Witnesses
Odin P. Roberts
Thomas J. Cunningham

Inventors
Charles S. Gooding
and Victor Beauregard
by their Attorney, Reuben L. Roberts.

(No Model.) 19 Sheets—Sheet 18.
C. S. GOODING & V. BEAUREGARD.
MACHINE FOR CUTTING BOOT OR SHOE SOLES, &c., FROM SHEET MATERIAL.
No. 593,537. Patented Nov. 9, 1897.
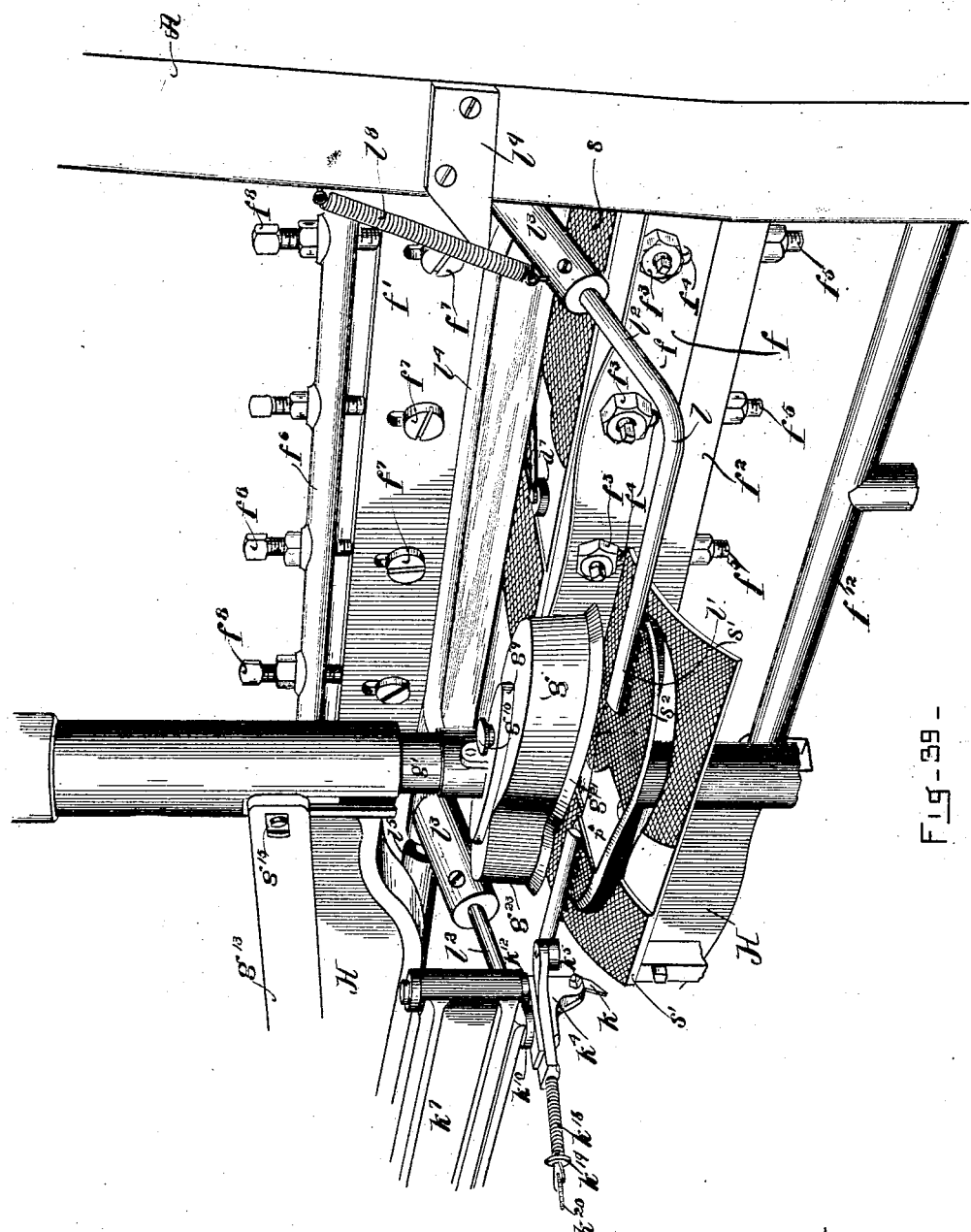

(No Model.) 19 Sheets—Sheet 19.
C. S. GOODING & V. BEAUREGARD.
MACHINE FOR CUTTING BOOT OR SHOE SOLES, &c., FROM SHEET MATERIAL.
No. 593,537. Patented Nov. 9, 1897.
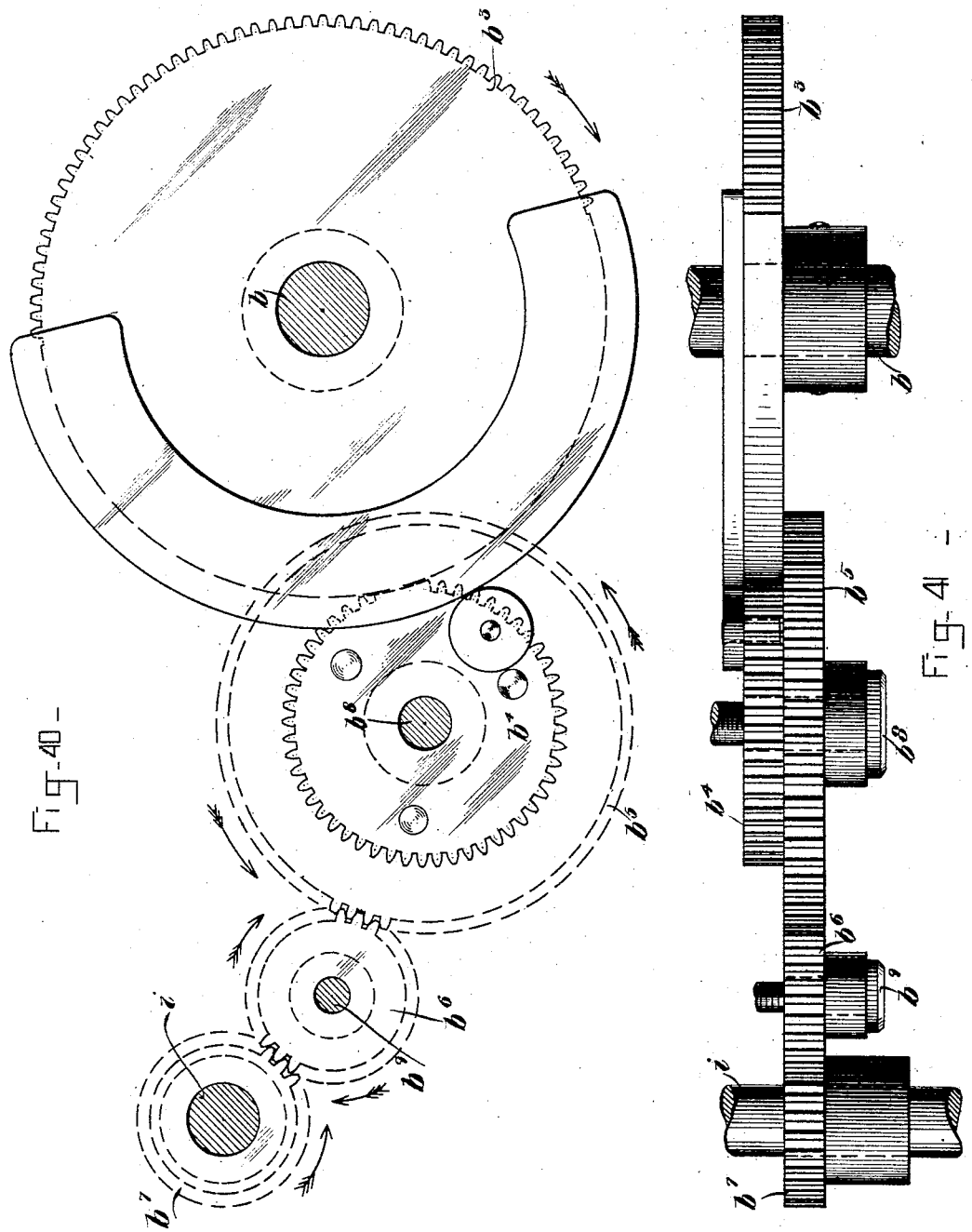

United States Patent Office.

CHARLES S. GOODING, OF BROOKLINE, AND VICTOR BEAUREGARD, OF BOSTON, MASSACHUSETTS, ASSIGNORS TO ROBERT D. EVANS AND JOHN S. LOCKWOOD, OF BOSTON, MASSACHUSETTS.

MACHINE FOR CUTTING BOOT OR SHOE SOLES, &c., FROM SHEET MATERIAL.

SPECIFICATION forming part of Letters Patent No. 593,537, dated November 9, 1897.

Application filed February 12, 1897. Serial No. 623,330. (No model.)

*To all whom it may concern:*

Be it known that we, CHARLES S. GOODING, of Brookline, in the county of Norfolk, and VICTOR BEAUREGARD, of Boston, in the county of Suffolk, both in the Commonwealth of Massachusetts, have invented certain new and useful Improvements in Machines for Cutting Boot or Shoe Soles and other Articles of Curvilinear Outline from Sheet Material, of which the following description is a specification.

The machine is especially adapted to cutting boot and shoe soles from sheets of unvulcanized india-rubber, upon which is usually embossed, at convenient intervals, ornamental or designating figures—such, for instance, as is commonly called the "medallion" and contains the name of the manufacturer of the shoes or the trade-design, and which it is desired to have located in the middle of each sole; and one of the objects of the improvements is to accurately place each of these medallions successively in the middle of the pattern in accordance with which the sole is to be cut. By changing the shape of the pattern any article of curvilinear outline may be cut from sheet material.

The invention consists in improvements in the several parts of the machine, as follows: in the feeding mechanism and in the devices by which such mechanism is automatically regulated by the action upon said devices of projections carried by the material, so that the extent of each intermittent movement of the feeding mechanism will accurately correspond with the distance between each two successive ornamental or designating figures or projections formed upon the material which is being fed, one of which figures is intended to be placed in the middle of each article cut therefrom; in the guide or adjuster for the strip of material which is being fed; in the clamping-pattern by which the blank is held and the form or pattern in accordance with which the articles are cut and the mechanism by which the said clamp and form are supported and operated; in the mechanism which supports and operates the cutter or trimming-knife and by which the plane of the blade thereof is always kept tangent to the varying curves of the pattern during the cutting of each article; also in the mechanism for removing from the pattern the article after it is cut and the scrap or superfluous portion of the blank or waste material around it.

In the drawings the machine is illustrated as cutting shoe-soles, and the construction and operation of the several improvements are more particularly set forth in the description hereinafter contained with reference to the drawings, wherein—

Figure 2:
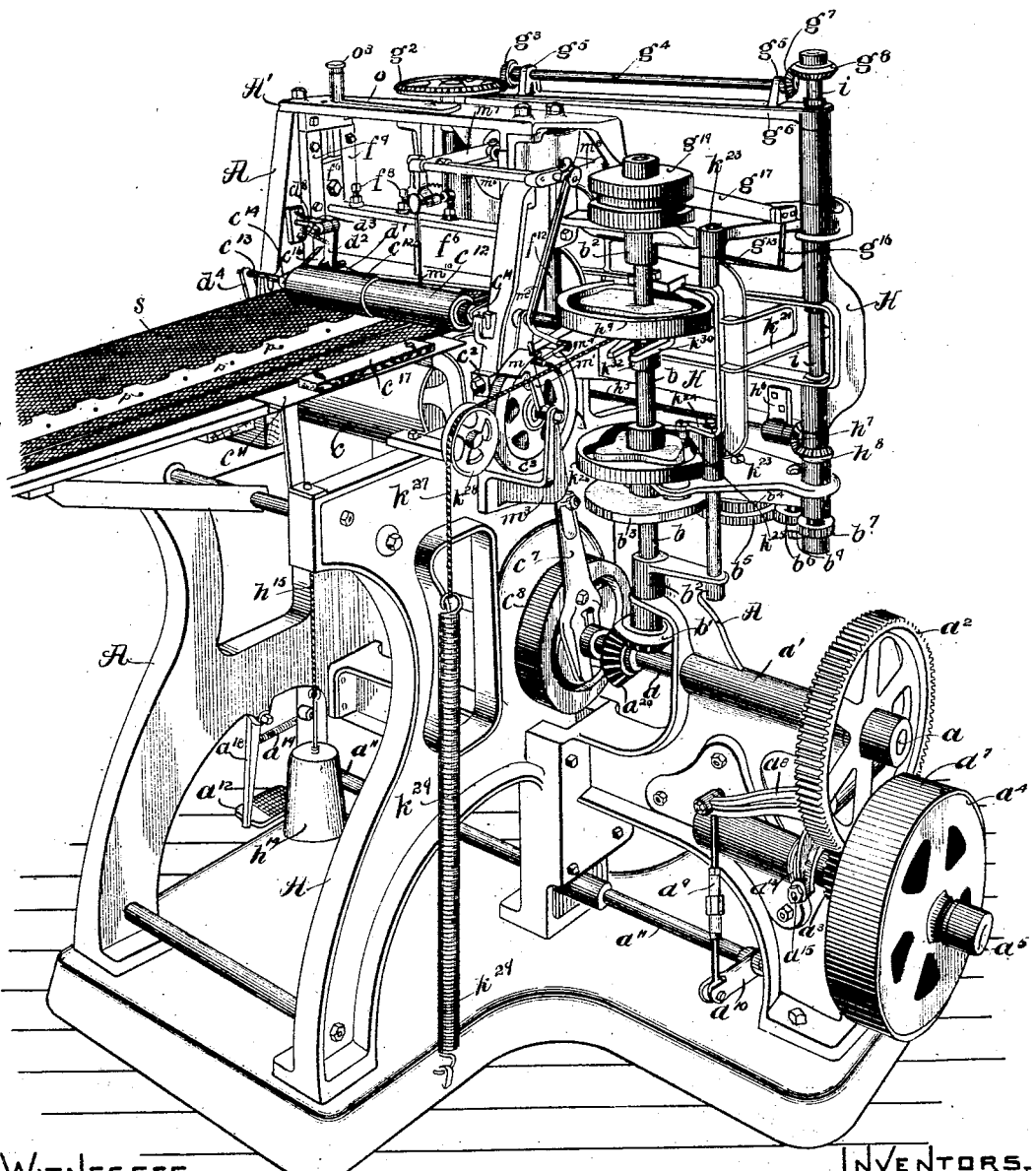
Figure 4:
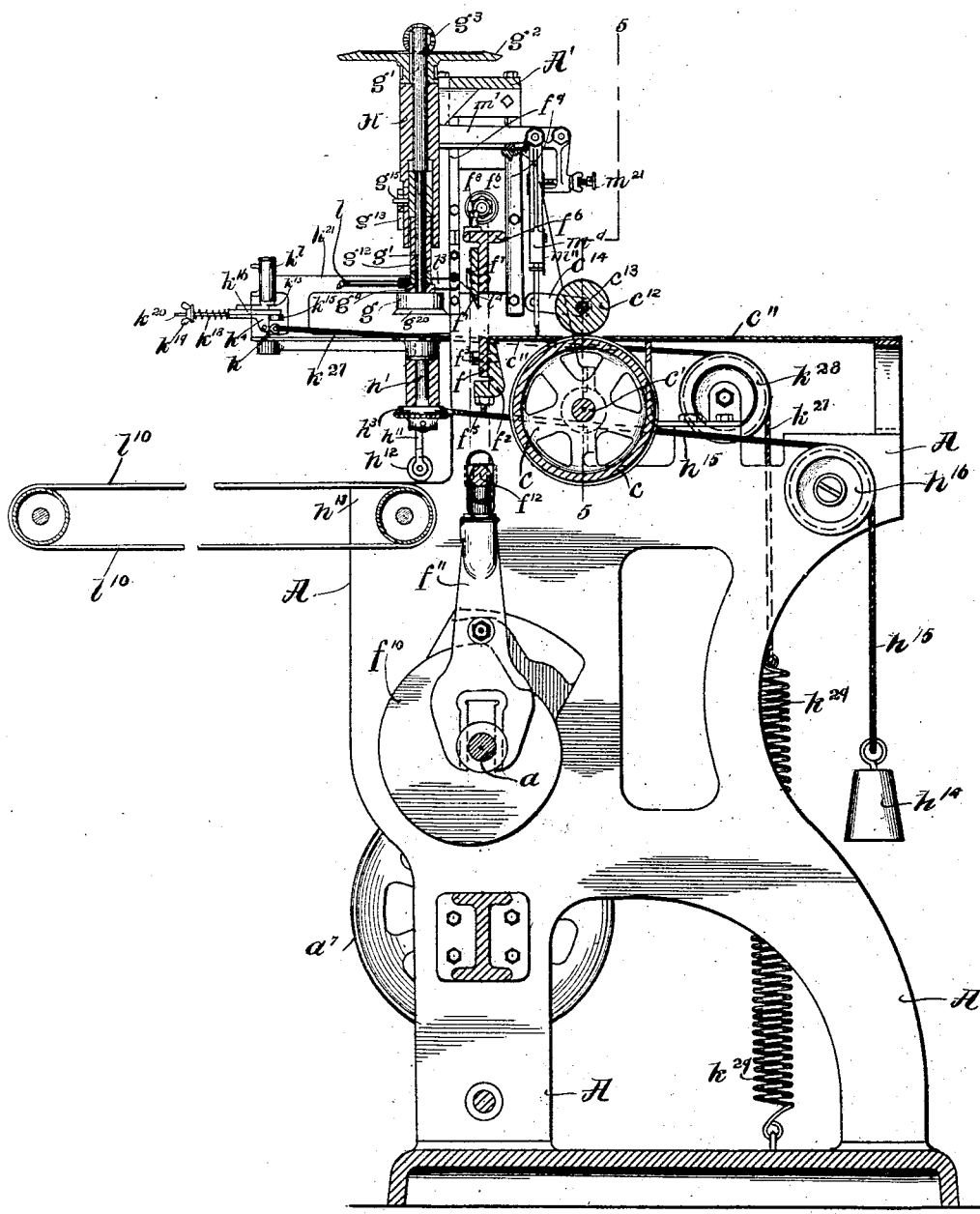
Figure 5:
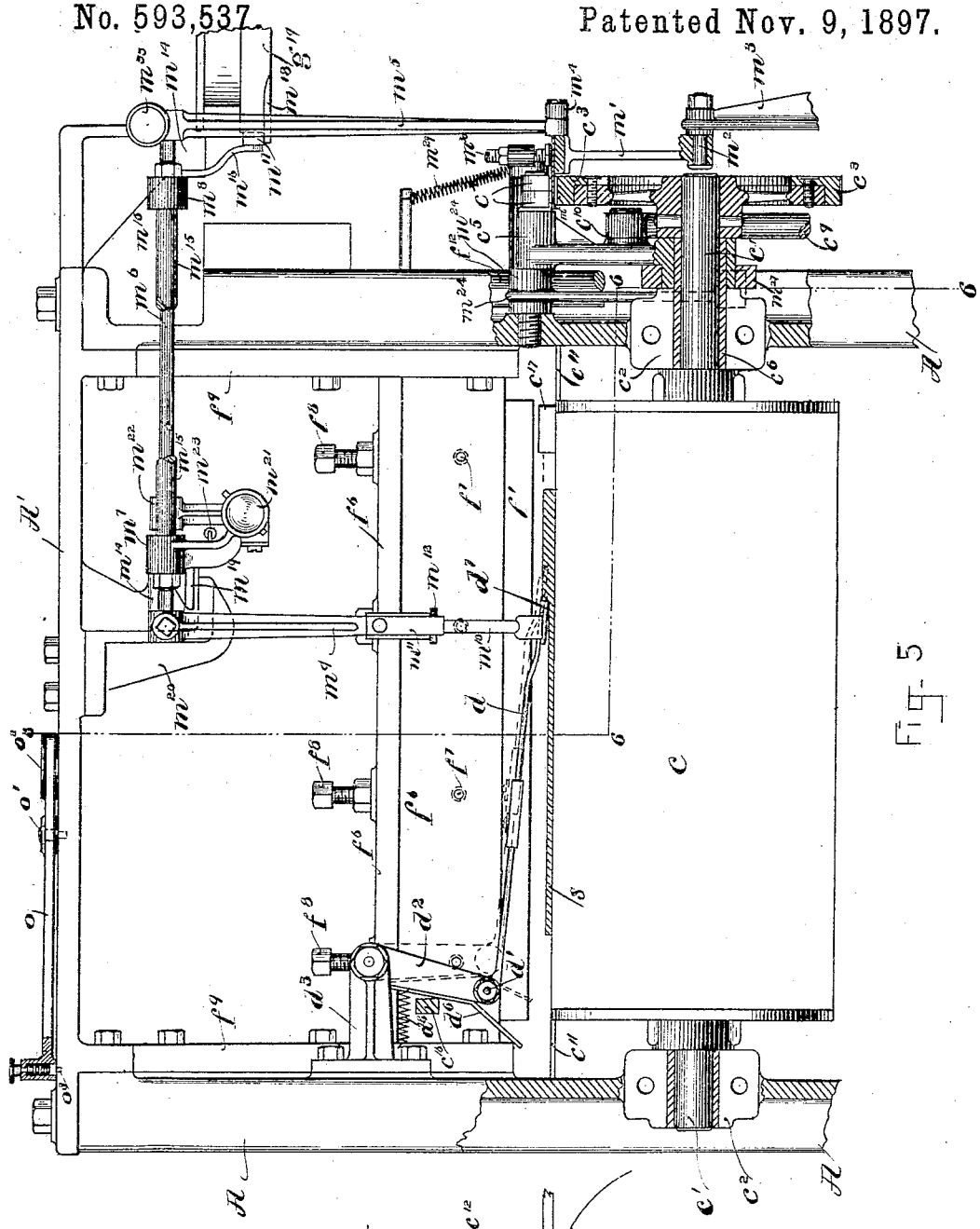
Figure 5A:
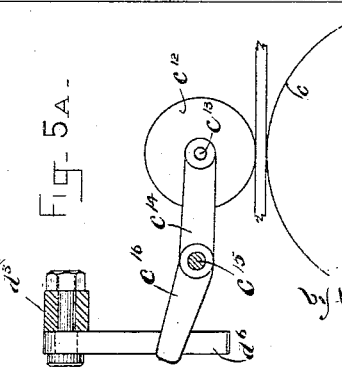
Figure 8:
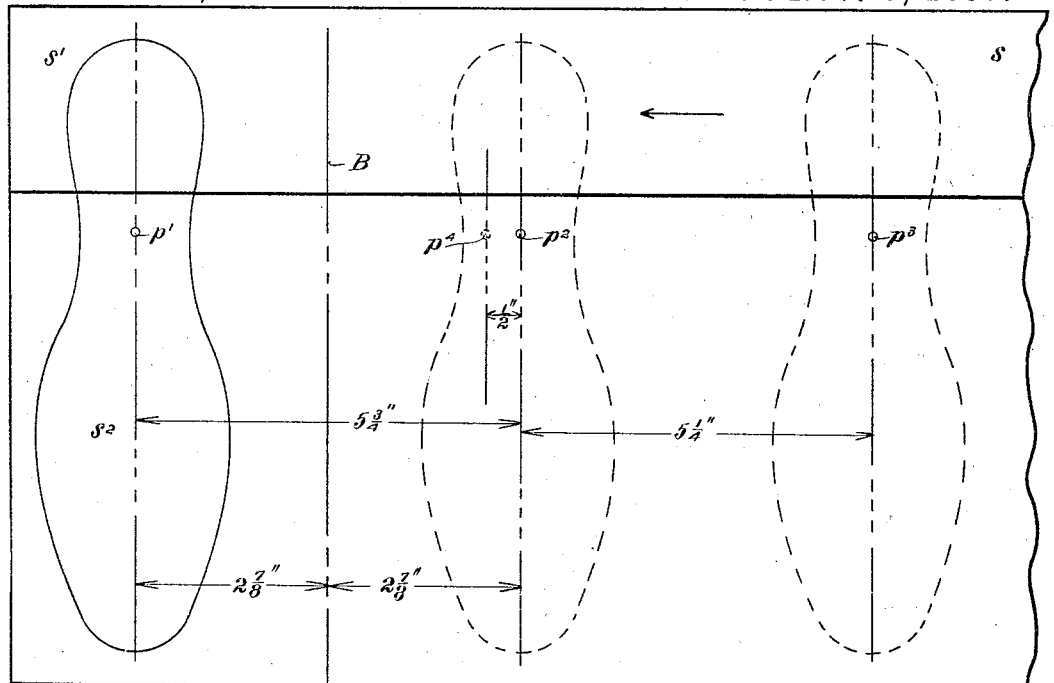
Figure 8A:
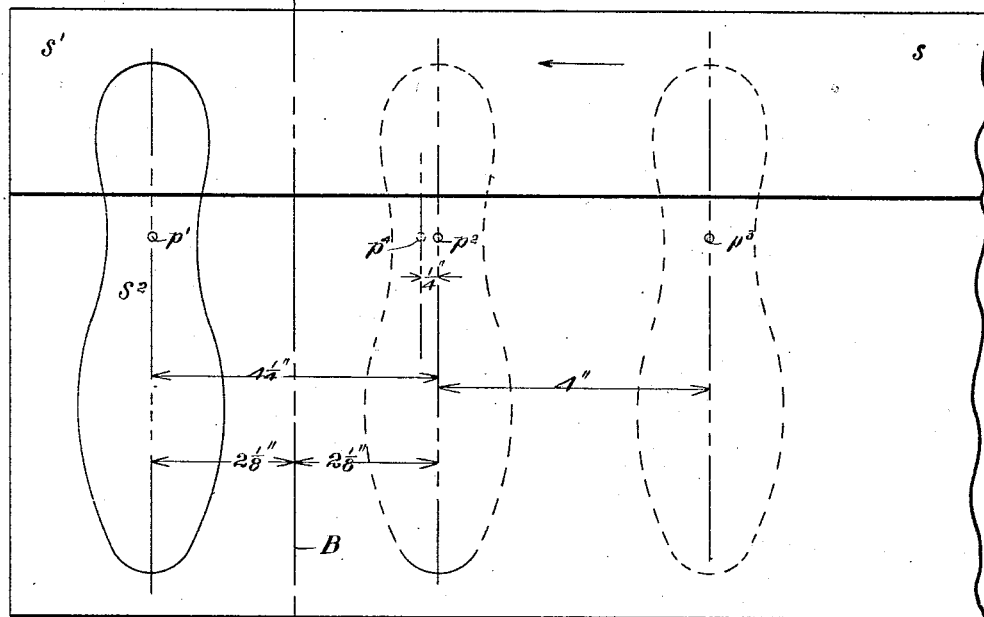
Figure 36:
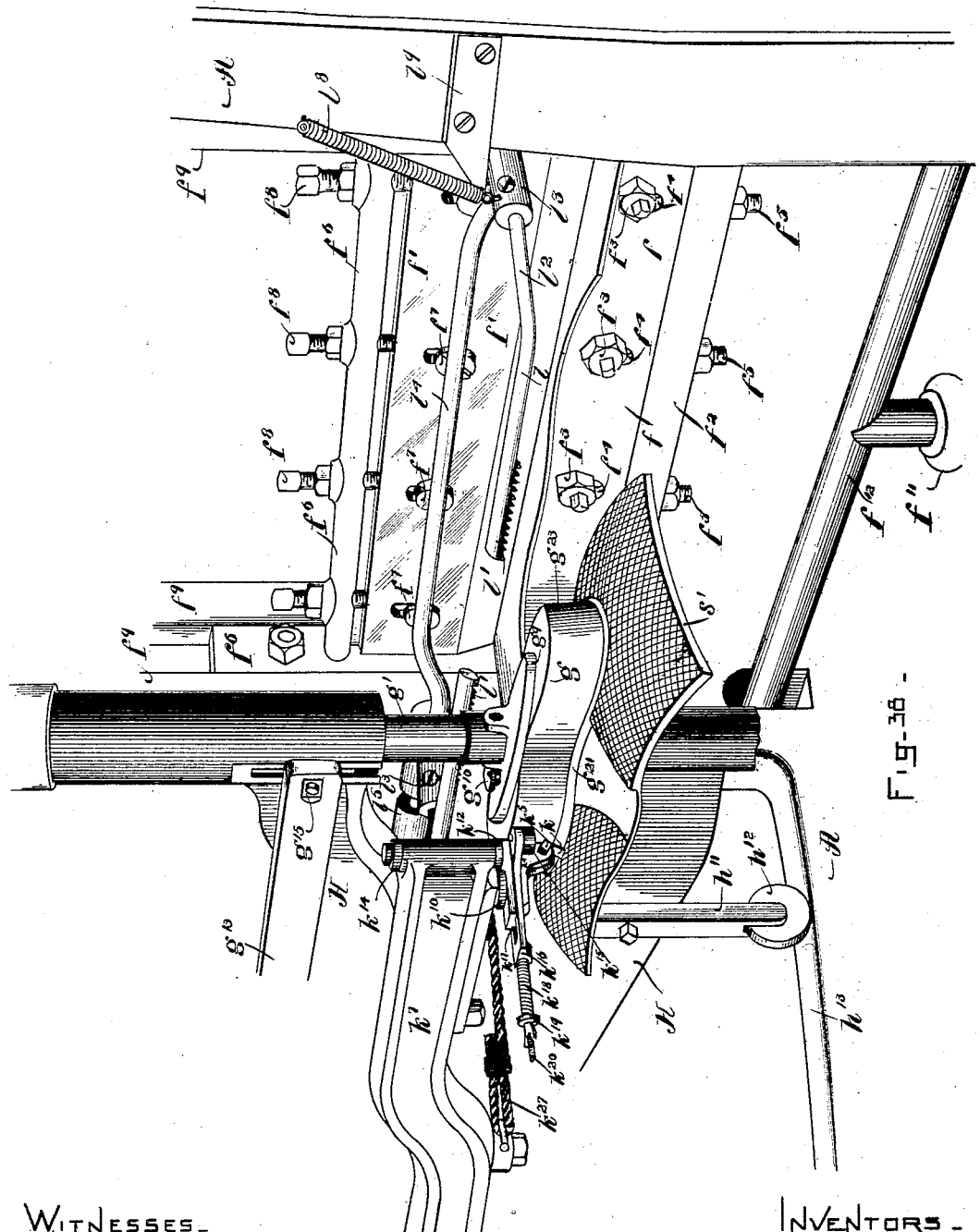

Figure 1 is a perspective view of the improved machine, taken from the front. Fig. 2 is a perspective view of the same, taken from the rear. Fig. 3 is a front elevation. Fig. 3ª is a vertical section of the friction-clutch for the driving mechanism. Fig. 4 is a vertical longitudinal section taken on line 4 4, Fig. 3, looking from the right thereof. Fig. 5 is a sectional elevation taken on line 5 5, Fig. 4, looking from the right, illustrating the measuring or feed-regulating device, feed mechanism, and guide for the rubber sheet, the bearing-rolls being removed. Fig. 5ª is a detail side elevation of the mechanism for actuating the guide or strip adjusting finger. Fig. 6 is a sectional elevation taken on line 6 6, Fig. 5, looking from the left, illustrating the feed-regulating device, the frame of the machine being shown in dotted lines. Fig. 6ª is a plan of a knurled collar on the actuating-finger of the feed-regulating devices to facilitate turning it to vary its length. Fig. 6ᵇ shows two views of a modification of construction for holding and adjusting the arm which carries the regulating device. Fig. 7 is a perspective view of the feed-regulating devices. Figs. 8 and 8ª are diagrams illustrating the locations of successive ornamental figures upon a strip of material or of projections correspondingly located thereon and their action upon the feed-regulating devices. Fig. 9 is a front elevation, partly in section, of the pattern or form and clamp-carrying lever. Fig. 10 is a plan view of the same. Fig. 11 is a plan view of the trimming-knife or cutter, carrying-arm, and actuating mechanism. Fig. 12 is a front elevation of the same. Fig. 13 is a plan view of the trimming-knife carrier. Fig. 14 is a side elevation of the same. Figs. 15 and 16 are views similar to Fig. 13, showing the position assumed by the different parts of the knife-carrier on different curves of the pattern. Fig. 17 is a longitudinal section of the knife-holder and part of the carrier and clamping-pattern, taken on the line 17 17, Fig. 13. Fig. 17$^a$ shows front and side elevations of the cutter or trimming-knife. Fig. 17$^b$ is a horizontal section of the cutter-holder. Fig. 17$^c$ is a vertical section showing ball-bearings for the knife-carrier. Fig. 18 is a plan view of the clamping-pattern. Fig. 19 is a vertical section of the clamp, taken on line 19 19, Fig. 18. Fig. 20 is a sectional side elevation of a simplified form of the plate for stripping the sole from the clamp. Figs. 21 to 32, inclusive, are diagrammatic illustrations of the relative positions of the trimming-cutter and clamp during the process of cutting a sole. Fig. 33 is a plan view of the mechanism for removing the completed sole and the scrap from the form or pattern. Fig. 34 is a front elevation of the same. Fig. 35 is a sectional elevation taken on line 35 35, Fig. 34, looking toward the left of said figure. Figs. 36, 37, 38, and 39 are perspective views taken from the front of the machine, showing the clamp, cutting mechanism, and sole-remover in different positions assumed by each during the process of feeding the blank, cutting the sole, and removing the sole and scraps from the form. Fig. 40 is a plan view, and Fig. 41 a side elevation, of the gearing by which the form and clamp are intermittently rotated.

Similar letters indicate the same part of the machine throughout the several views of the drawings.

Referring to the drawings, the main driving-shaft $a$, having bearings $a'$ $a'$ in the frame A of the machine, is rotated by means of the gear $a^2$. Said gear $a^2$ meshes the pinion $a^3$, which is made fast to a leather-covered conical flange or pulley $a^4$. (See Fig. 3$^a$.) The pinion and flange $a^4$ rotate upon a stud $a^5$, fixed to the frame of the machine. The flange $a^4$ and pinion $a^3$ are moved lengthwise of the stud $a^5$, so that the conical face of $a^4$ engages the conical face $a^6$, formed within the driving-pulley $a^7$, by means of the bell-crank lever $a^8$, link $a^9$, arm $a^{10}$, treadle rock-shaft $a^{11}$, and treadle $a^{12}$. (See Figs. 1 to 3$^a$.)

The bell-crank $a^8$ is pivoted to the frame of the machine and has its arm $a^{13}$ forked to span the hub of the pinion $a^3$. Through the lower ends of the forked arm $a^{13}$ are studs $a^{15}$, on the inner ends of which are friction-blocks, which engage a groove $a^{16}$, formed in the hub of said pinion $a^3$. The treadle $a^{12}$ when depressed pushes the flange $a^4$ into contact with the conical face $a^6$ of the driving-pulley through the mechanism just described, while a spring $a^{17}$ raises the treadle when released and disengages the flange $a^4$ from the driving-pulley, thus stopping the machine. The pulley $a^7$ is loose upon the stud $a^5$ and is constantly rotated by a driving-belt from the source of power. When the treadle $a^{12}$ is pressed downward to the position shown in Fig. 1, it is held there by an arm $a^{18}$, which being pivoted to the frame of the machine is drawn over the treadle by a spring $a^{19}$, where it will rest against the upper side of the treadle until the operator releases it with his foot by pushing the arm $a^{18}$ to one side of the treadle, when the spring $a^{17}$, Fig. 3, will raise the treadle again to the position shown in Fig. 2. The vertical cam-shaft $b$ is turned by its connection with the driving-shaft $a$ through the miter-gears $b'$ $a^{20}$, the shaft $b$ having bearings in the frame of the machine at $b^2$ $b^2$. (Best seen in Fig. 2.)

The rubber or other material from which the soles or other articles are to be cut is preferably fed into the machine in the form of a sheet or strip and from a reel. The feeding mechanism consists of a roll or cylinder $c$, fastened on a shaft $c'$, having bearings at $c^2$ in the frame of the machine, Figs. 2 and 5. Upon the end of the shaft $c'$ is fixed a ratchet $c^3$, said ratchet being turned in the direction of the arrow, Fig. 6, by the spring-pawls $c^4$ $c^4$, pivoted upon an arm $c^5$. A wheel and clutch may be used instead of the ratchet and pawls. The arm $c^5$ is rocked upon the fixed sleeve $c^6$ by means of the cam $c^8$, which actuates the cam-slide $c^7$, forked at the lower end to straddle the shaft $a$, which serves as a guide therefor. The other end of the cam-slide $c^7$ is connected through the rod $c^9$ to the arm $c^5$ by a pivot $c^{10}$. The rubber sheet $s$ is supported upon each side of the feed-roll by a table $c^{11}$, Fig. 4, and is pressed against the feed-roll $c$ by the idler bearing-rolls $c^{12}$ $c^{12}$, thus avoiding any danger of the rubber slipping upon the feed-roll $c$, and thereby interfering with the accuracy of the feeding. The rolls $c^{12}$ $c^{12}$ turn loose upon a rod $c^{13}$, which is fastened to arms $c^{14}$ $c^{14}$, pivoted to the frame of the machine at $c^{15}$, Figs. 4 and 5. The idler-rolls illustrated are made of different diameters to conform to the shape of the upper surface of the rubber sheet, which is thicker in the portion from which the heels are to be cut, as seen at the right-hand side in Fig. 5, the roll for this heel portion being made smaller than the roll for the remainder of the sheet.

The india-rubber compound, after it has been formed into a sheet by the calendering-rolls and at the same time embossed at regular intervals with the ornamental medallions or designating-figures $n$, Fig. 7, and also with projections which are to regulate the feeding mechanism, is either placed upon boards or wound upon a reel, and in the handling and while feeding from the reel or boards along the table $c^{11}$ to the blank cutting-shears it is liable to be stretched more or less and unevenly, so that the distances between the centers of the medallions upon the sheet or between the said projections thereon, although equidistant upon the sheet when it first leaves the calendering-rolls, will vary when the sheet is being fed to the form in the sole-cutting machine to be cut into soles, as described. If, therefore, the feeding mechanism moved the rubber sheet a constant or unvarying distance at each rotation of the shaft, the centers of the medallions would not always stop at the center of the form by reason of the unequal distances between them.

To insure perfect and satisfactory work, it is absolutely essential that the medallion should always be placed in the center of the form, so that when the sole is cut the medallion will be in the center thereof and the sole be symmetrical. In order to accomplish this result, feed-regulating mechanism is provided which is so constructed that while the pawls $c^4$ $c^4$ are always moved through the same arc of a circle, both in their forward and backward throw, the point at which they engage the ratchet-wheel $c^3$ upon the beginning of their forward stroke, and hence the angle through which the ratchet is turned and the length of the portion of rubber which is fed, are determined by the position of a shield $m$ in relation to the arc through which the pawls $c^4$ move over the ratchet, the position of the shield $m$ being regulated by the projections upon the rubber sheet through mechanism illustrated in Figs. 5, 6, and 7, wherein it will be seen that the shield $m$ is formed on a curve concentric with the ratchet $c^3$, the inner face of the shield just clearing the outer edges of the teeth of the ratchet. This shield $m$, which projects over the teeth of the ratchet, Figs. 5 and 7, is fastened to an arm $m'$, pivoted upon a stud $m^2$ on the bracket $m^3$, fixed to the frame A of the machine. The axis of the pivotal stud $m^2$ is in line with the axis of the shaft $c'$, so that as the arm $m'$ is rocked backward or forward, as hereinafter described, the shield $m$ will pass by the teeth of the ratchet in the same manner as though pivoted directly upon the shaft $c'$; but the position of the shield $m$ will not be changed by the motion of the shaft $c'$ when the rubber strip is being fed, as would be liable to be the case if the arm $m'$ were pivoted directly upon the shaft $c'$. The arm $m'$ is connected by the link $m^4$ to an arm $m^5$ by means of a screw $m^{33}$. The said arm $m^5$ is adjustably connected to the rock-shaft $m^6$, which has bearings in the arms $m^7$ $m^8$. An arm $m^9$ is also made fast to the rock-shaft $m^6$ and has a finger $m^{10}$ screwed into its lower end. The finger $m^{10}$ is arranged so as to hang in the path of movement of the projections $p$ $p$ upon the rubber sheet as it is fed, and this finger is adjusted at such a height as to be acted upon by those projections, but to clear the surface of the rubber sheet itself. The finger $m^{10}$ may be adjusted up or down by screwing it into or out of the arm $m^9$, and is locked in its position by the flat spring $m^{11}$, one end of which is screwed to the arm $m^9$ and the other bears against the knurled disk $m^{12}$ upon the finger $m^{10}$. For the purpose of giving a better bearing for the spring $m^{11}$ the disk $m^{12}$ is flattened on two opposite sides, as shown in Fig. 6$^a$; but the spring is not sufficiently strong to prevent the finger being turned, when desired, for purposes of adjustment. The length of the arm $m'$ from the center of the stud $m^2$ to the point where the link $m^4$ is connected thereto is equal to the distance from the center of the shaft $c'$ to the bottom of the teeth of the ratchet $c^3$, and the perpendicular distance from the center of the rock-shaft $m^6$ to the lower end of the arm $m^5$, where the link $m^4$ is connected to it, is substantially equal to the length of the arm $m^9$ with the finger $m^{10}$ attached and in its normal position. It is therefore evident that when the end of the finger $m^{10}$ is moved a certain distance by a projection upon the rubber sheet as it is fed forward the shield $m$ will be moved a corresponding distance in the same direction around the periphery of the ratchet $c^3$. The arms $m^7$ and $m^8$ are fastened to a rock-shaft $m^{13}$, said rock-shaft having bearings $m^{14}$ $m^{14}$ in the cross-head A' on the frame of the machine. The arms $m^7$ $m^8$ are joined together at the ends opposite to the shaft $m^{13}$ by a stay-rod $m^{15}$. Thus the two arms $m^7$ $m^8$, rock-shaft $m^{13}$, and stay-rod $m^{15}$ form a rectangular frame pivoted upon the cross-head A' at $m^{14}$ and having pivoted thereon the swinging arms $m^5$ and $m^9$ by their attachment to the shaft $m^6$. (See Fig. 7.) The arm $m^8$ has a downwardly-projecting arm $m^{16}$, Figs. 5 and 7, provided with a cam-roll $m^{17}$, which engages at the proper time a projection $m^{18}$ on the cam $g^{19}$, thus raising the arms $m^8$ and $m^7$, connected thereto, and also the arms $m^9$ and $m^5$, the object being to lift the finger $m^{10}$ sufficiently to clear the projections upon the rubber sheet just before each feeding movement and lower the finger into the path of the next projection before each successive feeding movement of the sheet is finished. The arm $m^7$ has a projection $m^{19}$ thereon, which rests upon a bracket $m^{20}$ when the arm $m^7$ is down in its normal position. A screw $m^{21}$ in the arm $m^7$ forms an adjustable stop against which the arm $m^{22}$, secured to the rock-shaft $m^6$, is drawn by a spring $m^{23}$ when the finger $m^{10}$ is released from a projection upon the rubber sheet.

The operation of the feed-regulating and feeding mechanism as a whole is as follows: Assuming the center of the form to be at a distance of two and seven-eighths inches to the left of the cutting-line B of the shears, Fig. 8, and the rubber sheet to have been fed in the direction of the arrow until the projection $p'$ is on the center line of the form and the next projection $p^2$ on the sheet $s$ to be five and three-fourths inches from the projection $p'$, the shears and clamp descend, the shears severing a blank from the sheet and the clamp clamping it to the form. The arm H then carries the form and clamp with the blank to the cutter $k$, which cuts the sole. Then as the arm H returns toward the shears the clamp rises and the sole and scrap are removed by the fingers $l$ $l$. (See Figs. 36 to 39.)

As the arm H returns toward the shears the finger $m^{10}$ is raised by the cam projection $m^{18}$, acting upon the arm $m^{16}$, high enough to clear the projection $p^2$, as previously described. The shield $m$, having been adjusted by the action of the projection $p^2$ upon the finger $m^{10}$ at the previous feeding operation, is now in such a position relatively to the ratchet $c^3$ that when the pawls $c^4$, which are at this time resting upon the shield $m$, Figs. 6 and 7, are thrown forward by their actuating mechanism they will, after passing off from the shield $m$ and engaging the teeth of the ratchet, turn the ratchet $c^3$ and feed-wheel $c$ through an arc measuring five and three-fourths inches on the perimeter of the feed-wheel, thereby feeding the rubber sheet forward five and three-fourths inches and bringing the projection $p^2$ into the position formerly occupied by $p'$ and the next succeeding projection $p^3$, which we will assume to be only five and one-fourth inches from $p^2$, to the position $p^4$, shown as a dotted circle, Fig. 8. The shield $m$ is locked in the position to which it is moved by each projection on the rubber sheet and held there until the feeding-pawls $c^4$ have passed off. This is effected by a rocking clamp-lever $m^{24}$, pivoted on a stud $m^{25}$, fast to the frame of the machine, one arm of the lever $m^{24}$ being provided with a screw $m^{30}$, the lower end of which bears upon the shield $m$ during all the time that the pawls are in contact therewith. The other arm of the clamp-lever has a cam-roll $m^{26}$, which bears against the rocking cam $m^{27}$, adjustably fixed upon the hub of the pawl-carrying arm $c^5$ by the set-screw $m^{28}$. A spring $m^{29}$ keeps the roll $m^{26}$ against the cam $m^{27}$. After the pawls have left the surface of the shield $m$ and have engaged the ratchet $c^3$ and are feeding the rubber sheet forward the depression on cam $m^{27}$ releases the clamp-lever $m^{24}$, and the shield $m$ and finger $m^{10}$ are moved back by the spring $m^{23}$ until the arm $m^{22}$ rests against the screw $m^{21}$, Fig. 6. The projection $m^{18}$ on cam $g^{19}$, having passed by the roll $m^{17}$, the finger $m^{10}$ drops until the projection $m^{19}$ rests upon the bracket $m^{20}$, which brings the finger $m^{10}$ into the path of movement of the projection $p^3$, and as it advances to the position shown by the dotted circle $p^4$, which is five and one-fourth inches from the center of the form $h$, it pushes the finger $m^{10}$ along one-half inch nearer to the shears than it was in the position it formerly occupied when resting against the projection $p^2$. By the same operation the shield $m$ is pushed one-half inch farther to the left, Fig. 6, by the mechanism connecting the shield $m$ and finger $m^{10}$. The pawls now move back in a direction opposite to that of the arrow, Fig. 6, and before they leave the periphery of the ratchet and ride up onto the shield $m$ the cam $m^{27}$ locks the shield through the lever $m^{24}$ and screw $m^{30}$, so that when the pawls strike it they will not move it from the position in which it has been placed by the projection $p^4$. The operation is now repeated; but at the next forward movement of the pawls it is evident that they will engage the ratchet at a point one-half inch to the left, Fig. 6, of the point at which they engaged it in the previous movement, and as the pawls always stop at the same point in their forward movement it is evident that the feed will be one-half inch shorter than at the previous forward movement. Consequently upon the next movement the projection $p^3$ will move five and one-fourth inches from the point $p^4$, to which it has now been fed, and this will bring it to the center of the form.

In the above description of the feed-regulating mechanism it will be observed that the form is always brought back to the same point, with its center line two and seven-eighths inches from the cutting-line of the shears. All regulation of the feed, so as to correct variations in the distances between the projections, is done automatically by the feed-regulating mechanism, as described, and the cutting-line of the shears should be substantially half-way between the projections on the sheet, varying therefrom only by the amount which the distances between the projections vary, which rarely exceeds one-half inch in practice, and this amount would not bring the cutting-line of the shears inside of the space from which the sole is to be cut. The standard distance between the medallions upon each sheet, however, may vary in accordance with the style of shoe for which the sole to be cut therefrom is intended—that is to say, the normal distance between the medallions or projections on different sheets may in practice vary from four and one-fourth inches to five and three-fourths inches.

It is evident that if the sheet on which the normal distance between the projections is four and one-quarter inches were fed to the machine when adjusted so that the center of the form is two and seven-eighths inches from the shears the line of cut of the shears would be two and seven-eighths inches from one projection and only one and three-eighths inches from the next projection, and hence the line of cut of the shears would encroach upon one side of the space from which a sole is intended to be cut. To obviate this difficulty and bring the cutting-line substantially half-way between the medallions or projections upon the rubber sheet, the arm H is caused to carry the form to the position shown on $s'$ in Fig. 8ª by the means hereinafter described, where the center of the form $s^2$ is two and one-eighth inches from the cutting-line of the shears. The shield $m$ is then adjusted forward three-quarters of an inch in the direction of the arrow, Fig. 6, by loosening the clamp-screw $m^{33}$ and swinging the arm $m^5$ on the shaft $m^6$ sufficiently to move the shield $m$ toward the shears three-fourths of an inch, when the clamp-screw $m^{33}$ is again tightened. If now the rubber sheet illustrated in Fig. 8ª is fed through the machine, the ratchet-wheel $c^3$ will be turned through an arc three-fourths of an inch less than before and the medallions or projections will stop three-fourths of an inch nearer to the shears or two and one-eighth inches therefrom. The regulating device will act as before, but at the end of each intermittent feeding movement when the finger $m^{10}$ is released it will swing back three-fourths of an inch more than is necessary for soles of the style on the sheet shown in Fig. 8$^a$. This excess of movement of the finger $m^{10}$ may be prevented by turning in the stop-screw $m^{21}$ until the finger $m^{10}$ by the action of spring $m^{23}$ will be drawn back only to a position which is just outside of the maximum variation of distance between any two projections on the sheet which is being fed.

In Fig. 6$^b$ we have shown a modification of the construction for clamping the arm $m^5$ to the rock-shaft $m^6$ and adjusting its position therein, in which $m^{31}$ is a slotted arm pinned to the shaft $m^6$, and the arm $m^5$ is fastened to the arm $m^{31}$ by the thumb-screw $m^{32}$. The arm H is moved backward and forward a fixed distance by the cam $h^9$, and in order to vary the swing of the arm H toward the shears, so that the center of the form will stop at different distances from the cutting-line of the shears to meet the requirements of different styles of soles above mentioned, there is provided a stop-lever $o$, pivoted upon a stud $o'$ on the cross-head A', Figs. 5 and 7. As the arm H is swung up to the shears the hub of the gear $g^2$, carried by that arm, will strike against the short arm $o^2$ of the lever $o$, which may be set in different positions and locked by the spring-plug $o^3$ by its engagement with holes $o^4$ $o^4$, drilled at proper intervals in the top of the cross-head A'. The intervals of adjustment of the lever $o$ are made to correspond with the variation in width of the different styles of soles to be cut, so that when adjusted for a particular width and the arm H, which carries the form, strikes the stop the center of the form will be at the desired distance from the cutting-line of the shears. The arm H, by the action of cam $h^9$ upon cam-roll $h^{10}$, is moved positively toward the shears to a position of about three inches from the cutting edge of the shears. At this point one side of the cam-groove $h^9$ is cut away, so that it will not act upon the arm H, its further movement toward the shears until it is stopped by the lever $o$ being controlled by a weight $h^{14}$, attached to the arm H by the cord $h^{15}$, which runs over an idler-pulley $h^{16}$ on the frame of the machine, Fig. 4. As the material is moved forward by the feeding-rolls it has a tendency to run a little to one side or the other. To correct this tendency and in order that the rubber sheet $s$ may be properly fed onto the form or pattern, so that the heel-line will always be at the correct point, there is provided an adjustable reciprocating guide or finger $d$, pivoted at $d'$ to an arm $d^2$, which is pivoted to a bracket $d^3$ upon the frame of the machine. At the outer end of the finger $d$ is a friction-roll $d^7$, which rests upon the sheet of rubber as it is fed, Fig. 5. Before the rubber is fed forward, as described, the rolls $c^{12}$ $c^{12}$ are raised by means of the cam-slide $d^4$ and cam $d^5$, Fig. 1. One end of the cam-slide $d^4$ is forked to embrace the shaft $a$, which serves as a guide, and the other end of $d^4$ is fast to the rod $c^{13}$. When the rolls $c^{12}$ $c^{12}$ are raised, the extension $c^{16}$ on the arm $c^{14}$, Figs. 5 and 5$^a$, strikes an incline $d^6$ on arm $d^2$ and pushes it to the right, as shown in dotted lines, Fig. 5, and with it the arm $d$, carrying the friction-roll $d^7$, which comes in contact with the inner edge of the raised heel portion of the rubber sheet and pushes it to the proper position. An adjustable guide $c^{17}$, fastened to the table $c^{11}$, serves as a guide or stop for the outer edge of the rubber sheet and prevents it from getting too far to the right, Fig. 5. After the sheet has been pushed to the correct position, as described, the cam $d^5$, Fig. 1, allows the rolls $c^{12}$ to drop back upon the rubber sheet, the guide-finger $d$ meantime being drawn back by the spring $d^8$ to the position shown in full lines, Fig. 5, and the sheet is fed forward between a pair of blank-cutting shears $f$ $f'$ and a clamping-pattern $g$ and form $h$ until the center of the foremost medallion thereon is in the longitudinal median line of the said form and clamp, the feed being regulated to accomplish this result by the feed-regulating devices hereinabove described. The lower shear-blade $f$ is fastened to a stationary cross-head $f^2$ by screws $f^3$ $f^3$ and is slotted at $f^4$ $f^4$ to permit of vertical adjustment by means of screws $f^5$ $f^5$, Fig. 36. The cutting edge of the shear-blade $f$ is on a level with the top of the table $c^{11}$. The upper shear-blade $f'$ is fastened to the vertically-reciprocating cross-head $f^6$ by screws $f^7$, the blade $f'$ being adjusted on the cross-head $f^6$ by means of the screws $f^8$. The cross-head $f^6$ is formed to slide in ways $f^9$ upon the frame of the machine and is raised and lowered by the cam $f^{10}$ and cam-slide $f^{11}$, Fig. 1. The cam-slide $f^{11}$, forked at its lower end to embrace the shaft $a$, is connected by the yoke $f^{12}$ to the sliding cross-head $f^6$. The form $h$ is made of the desired shape of the sole which is to be cut and is supported upon the vertical shaft $h'$, where it is held and prevented from turning thereon by a pin $h^2$. The shaft $h'$ has a bearing in the end of the lower portion of the swinging arm H and is intermittently rotated by its connection with the shaft $i$ through the bevel-gears $h^3$ $h^4$, shaft $h^5$, and bevel-gears $h^7$ $h^8$, the shaft $h^5$ having bearings $h^6$ $h^6$ in the arm H. The clamp $g$, Figs. 18 and 19, is of the same outline as but a little smaller than the form $h$ and is formed with an edge or lip $g^{20}$ of the same bevel and contour as the edge of the sole to be cut. The upper side $g^{21}$ of this lip also corresponds substantially with the plane of the cutting edge of the trimming-knife $k$, and on the lower side $g^{22}$ it is beveled to give its extreme outer edge a firm bearing upon the rubber sheet, which is held between it and the pattern or form $h$ while the sole is being cut. (See Fig. 17.) From the upper limit of the incline $g^{21}$ the sides $g^{23}$ of the clamp $g$ are vertical and of a contour in outline substantially parallel to the outer edge of $g^{20}$, Fig. 18.

To prevent the rubber from adhering to the clamp $g$ when the latter is raised, as hereinafter described, we provide a spring-plate $g^{24}$, supported upon screws $g^{25}$ $g^{25}$, fixed to the clamp $g$. The plate $g^{24}$ is forced downward by springs $g^{26}$, which conveniently may be arranged around said screws, Fig. 19. When the clamp is pressed down against the rubber supported on the form $h$, the plate $g^{24}$ is pushed upward into the recess $g^{27}$, as shown in dotted lines, Fig. 19, and when the clamp is raised the said plate is forced downward by the springs, which separates the rubber from the edge of the clamp $g$. In Fig. 20 is illustrated a simple construction of such a plate, which may be made of wood.

Figures or letters to be stamped upon the sole to indicate the size of the shoe are attached to the plate $g^{24}$, as at $g^{28}$ in Figs. 18 and 19.

The clamp $g$ is intermittently rotated at the same time and at the same speed as the form $h$ by means of the vertical shaft $g'$, to which it is attached by a thumb-screw $g^{10}$ in the plate $g^9$, which is fastened to said shaft and has pins $g^{11}$ upon its under side to prevent the clamp $g$ from turning thereon. The shaft $g'$ is splined to the bevel-gear $g^2$ (see Fig. 4) and is intermittently rotated by its connection with the said shaft $i$ through the bevel-gear $g^3$ on one end of the horizontal shaft $g^4$, having bearings $g^5$ $g^5$ on the arm $g^6$, and the bevel-gears $g^7$ $g^8$. The shaft $g'$ has a bearing in the upper end of the swinging arm H and is encircled by a sleeve $g^{12}$, Fig. 9, through which it is lowered and raised to clamp and release the rubber blank by means of the lever $g^{13}$, pivoted at $g^{14}$ in the arm H. The lever $g^{13}$ is slotted on its outer end to receive the slide-block $g^{15}$, pinned to the sleeve $g^{12}$. The lever $g^{13}$ is connected by the link $g^{16}$ to the cam-lever $g^{17}$, which is pivoted to the frame at $g^{18}$ and is raised and lowered by the cam $g^{19}$ on shaft $b$, Figs. 1 to 3. When the rubber sheet $s$ has been fed forward until the center of a medallion thereon is coincident with the longitudinal center line of the clamp and form, the shear-blade $f'$ and the clamp $g$ descend, the clamp pressing the rubber onto the form while the shears sever a "blank" or rectangular piece $s'$ from the end of the rubber sheet.

The next step in the operation is to carry the blank of rubber from the shears to the cutter which is to trim off the superfluous part of the blank around the pattern. This is accomplished by swinging the arm H upon the shaft $i$ as a fulcrum to the desired distance from the shears by means of the cam $h^9$ upon the shaft $b$, engaged by a cam-roll $h^{10}$ upon the arm H, and to give the arm H additional support a leg $h^{11}$, carrying a friction-roll $h^{12}$, is secured near the outer end of H, which roll runs upon a track $h^{13}$ upon the frame of the machine, Fig. 1.

The trimming knife or cutter $k$, (see Fig. 17a,) with which the sole is cut from the blank, is formed with the cutting-blade $k'$ at an angle of about forty-five degrees with the shank $k^2$, in order that the sole $s^2$ when cut shall have a beveled edge, as shown in Fig. 17. The cutting edge of the knife is also cut back at an angle, as seen at $k^3$ in Fig. 17a, in order to give a shearing cut as the rubber passes it, with a tendency to push the rubber down upon the form which supports it, the rubber blank being fed against the knife in the direction of the arrow, Fig. 17a, by the rotation of the form and clamp. The shank $k^2$ of the cutter $k$ is gripped in the holder $k^4$ by the screw $k^5$, Fig. 17b, with the plane of the shank at right angles to the line of movement of the cutter-adjusting plate $k^{16}$, hereinafter described. The cutter-holder $k^4$ is provided with a vertical cylindrical shank $k^6$, which has a bearing in a swinging arm $k^7$, and the cutter-holder is prevented from moving upward in said bearing by the shoulder $k^{13}$ and from moving downward by the washer $k^{14}$, secured to its upper end, Fig. 17. The axial line of the shank $k^6$ is directly over the middle of the cutting edge $k^3$ of the knife and during the cutting operation is also over the middle of the beveled edge of the portion of rubber which is being cut, as shown in Fig. 17, so that as the knife passes through the material in cutting out a sole from the blank there will be very little tendency to turn the knife and its holder upon the swiveling center $k^6$. On the other hand, it renders it a very easy matter to turn the knife in the rubber so as to guide it in a path tangential to the curve of the pattern at all points in a manner hereinafter described.

The cutting edge of the knife $k$ is adjusted so that it will just clear the edge of the form $h$, in order that the completed sole may be of the same size as this form or templet. To secure this result, a gage-roll $k^8$ is provided, which turns upon a pin $k^9$ in the center of the shank $k^6$ and is of such a diameter that when the periphery of the roll is in contact with the vertical face $g^{23}$ of the clamp $g$ the cutter $k$ will stand clear of the form $h$. It is very essential that the cutter-holder should turn with as little friction as possible, and to accomplish this two friction-rolls $k^{10}$ $k^{10}$ are hung on studs $k^{11}$ on the under side of the arm $k^7$, which rolls have a bearing against a cylindrical track $k^{12}$ on the upper part of the cutter-holder $k^4$, so that when the roll $k^8$ is brought to bear against the clamp $g$ the friction will be taken off the shank $k^6$ by the friction-rolls $k^{10}$ $k^{10}$. Instead of using the rolls $k^{10}$ $k^{10}$ we may insert ball-bearings $k^{33}$ between the washer $k^{14}$ and shoulder $k^{13}$ and the upper and lower ends of the bearing on the arm $k^7$, as illustrated in Fig. 17c.

In order to cut a perfect sole, it is necessary that the plane of the cutter-blade $k$ should at all times during the cutting operation be tangent to the curve of the sole at the point at which it is being cut, and for the purpose of securing this result two antifriction guide-rolls $k^{15}$ $k^{15}$ are provided, which rotate upon studs on the sliding knife-adjusting plate $k^{16}$, Figs. 13 to 16, the cutter-holder $k^4$ being grooved at $k^{17}$ $k^{17}$ to form ways to receive the sliding plate $k^{16}$. The guide-rolls $k^{15}$ $k^{15}$ are pressed forward and kept in contact with the vertical side $g^{23}$ of the clamp $g$ by the spring $k^{18}$, one end of which bears against the adjusting-plate $k^{16}$ and the other against the thumb-nut $k^{19}$ upon a screw-threaded rod $k^{20}$, one end of which is fast in the cutter-holder $k^4$.

In Fig. 13 is illustrated the position assumed by the gage-roll $k^3$ and the two guide-rolls $k^{15}$ as the heel of the shoe-sole passes the cutter $k$. It will be observed that in this position a straight line joining the centers of the said guide-rolls passes to the right of the center of the gage-roll. In Fig. 15 is a similar view illustrating the position assumed by the said rolls as the shank of the shoe-sole passes the cutter. In this position it will be seen that a straight line joining the centers of the guide-rolls passes to the left of the center of the gage-roll. In Fig. 16 is illustrated the position assumed by the said rolls as the reverse curve, leading from the shank to the ball of the shoe-sole, is passing the center, and in this case it will be seen that a straight line joining the centers of the guide-rolls $k^{15}$ will pass through the center of the gage-roll $k^3$. In each of the three cases illustrated it will be observed that by the operation of the rolls $k^{15}$ upon the adjusting-plate $k^{16}$, through the action of the spring $k^{18}$, the plane of the cutter-blade is always kept tangent to the curve of the sole at the point where the knife is cutting.

The cutter-holder upon the end of the swinging arm $k^7$ is kept firmly pressed against the clamp $g$ during the operation of cutting the sole by means of a spiral spring $k^{29}$, made fast at its lower end to the frame A and at its upper end to a cord $k^{27}$, which passes over a grooved pulley $k^{28}$, journaled upon the frame, and is attached to the arm $k^7$. When the cutter-holder is not bearing against the clamp, the position of the swinging arm $k^7$ is controlled by the cam-slide $k^{30}$, one end of which is attached to the said arm and the other is forked to embrace the shaft $b$, which serves as a guide therefor, while the cam-roll $k^{31}$ and open cam $k^{32}$ impart the necessary motion to the cam-slide to control the swinging movement of the arm $k^7$ in a manner hereinafter described.

In practice it is found that if the knife-holder which is pivoted upon the outer end of the arm $k^7$ is capable only of the movement to and fro permitted by swinging the said arm upon the pivot $k^{22}$ the knife will tend to separate from the rotating pattern or to imperfectly cut the material at the heel and toe portions of elongated shapes like shoe-soles, and will tend to be caught by the pattern, so as to be cramped back of it at the shank portions of the shoe-sole. This seems to be due chiefly to the fact that the pressure of the knife-holder against the pattern, which is caused by the spring attached to the cord $k^{27}$, is normally in a line which passes through the center of the shaft on which the pattern rotates and of the pivot on which the knife-holder turns, (illustrated by arc $xx$, Fig. 22,) so that when the middle of the heel or toe has passed the knife the direction of its line of pressure is approximately tangential to the curves of the pattern and the knife-holder is not pressed against the pattern with sufficient force to insure good work, while when the shank portions of the pattern are passing the knife the contact of the knife-holder with the pattern is so near to its center of rotation that the pattern tends to catch the knife and to cramp it behind the pattern before the knife-holder can be forced outward by the pressure of the side of the rotating pattern against it. To obviate these difficulties, the arm $k^7$, which is pivoted upon the forked cam-lever $k^{21}$ at $k^{22}$, is given a longitudinal movement to or fro by pivoting the cam-lever $k^{21}$ upon studs $k^{23}$ $k^{23}$, which are fastened to the frame of the machine. The lever $k^{21}$ is caused to swing back and forth on these studs by means of an arm $k^{24}$, bearing a cam-roll $k^{25}$, which engages with a cam-groove $k^{26}$. (See Figs. 11 and 12.) This cam-groove $k^{26}$ is made in such form that when the toe and heel portions of the pattern are passing the knife $k$ the knife-holder, and with it the knife, will be given a movement in the same direction as that of the advance of the edge of the rotating pattern toward the knife, which will carry the knife back or outside of its normal line of pressure, as shown in Fig. 24, and thus the knife-holder will be placed in a position to give it proper bearing upon the edge of the pattern as it revolves, one position of which is shown in Fig. 25; and when the narrow or shank portions of the pattern are passing the knife it will be given a movement in a direction opposite to the advance of the edge of the rotating pattern toward the knife, and thereby the knife will be carried forward or inside of its normal line of pressure, as shown in Fig. 27, which will prevent its being caught and cramped back of the pattern, as would be the case if the knife remained in the position shown in Fig. 30, while the pattern continued to revolve. These backward and forward movements of the knife are differential to the motion of the edge of the rotating pattern and will cause a diminution of the speed with which the material to be cut is fed to the knife when the direction of the movement is the same as that of the edge of the rotating pattern and an increase of such speed when the movement of the knife is in a direction opposite to that of the edge of the rotating pattern. This feature of the invention is obviously applicable to other machines for cutting by patterns of irregular peripheral outline articles from various kinds of material, the particular cutter employed for that purpose being such as may be best adapted to operate upon the material to be cut. Thus, for example, in a machine for cutting articles of wood or of metal in conformity to patterns of irregular form by means of appropriate rotary cutting-tools it might be found to be of great advantage to the successful operation of the cutter to diminish the relative speed with which the cutter and the edge of the pattern pass each other along those portions of the pattern where its peripheral outline is at or near the greatest radial distances from the center of rotation and to increase such relative speed along those portions of the pattern where its peripheral outline is at or near the shortest radial distances from the center of rotation.

From the description hereinbefore given it will be observed that the cutter is capable of three different movements while in the operation of cutting around the pattern—to wit, a swinging movement toward and from the pattern in lines substantially radial to its center of rotation by swinging the arm $k^7$ upon the pivot $k^{22}$, a swiveling movement upon the pivot $k^6$ of the knife-carrier by which the knife may be continually adjusted through the action of the rolls $k^{15}$, so that the plane of its blade will be kept always tangent to the curves of the periphery of the pattern, and the reciprocating movement, which is given at proper intervals by the action of the cam $k^{26}$ upon the arm $k^7$, thus rendering the machine capable of successfully cutting articles by patterns of extreme irregularity in their peripheral outline and with a rapidity and perfection never heretofore accomplished in practical manufacture.

In Figs. 21 to 32, inclusive, is diagrammatically illustrated a series of positions assumed by the clamp and form and by the cutter $k$ relatively thereto during the operation of cutting around one sole. The blank cut from the strip of material having been clamped between the form $h$ and clamp $g$, as described, the arms H and $k^7$ are moved by their respective cams $h^9 k^{26}$ from the position shown in Fig. 21 to that shown in Fig. 22, thus bringing the gage-roll $k^8$ and guide-rolls $k^{15}$ to bear against the clamp, as described. In this position the center of the cutter-holder shank $k^6$ is substantially in the normal line of pressure of the gage-roll against the pattern, which may be represented by the arc $x x$ of a circle having the axis of the shaft $i$ as a center, and which passes through both the center of $k^6$ and the center of $g'$. When the cutter and form are brought to the position shown in Fig. 22, the cutter pierces the rubber sheet, as shown in Fig. 37. The form is now rotated by the gearing hereinafter described, and as the cutter travels along the shank portion by the action of the cam $k^{26}$ on the lever $k^{21}$ it is given a movement to the left or inside of the normal line of pressure, as shown in Fig. 23, for the purpose heretofore described. The form continues its rotation to the position shown in Fig. 23ª and thence to that shown in Fig. 24, when the cutter is in the longitudinal central line of the form at the heel, and while the form is moving from the position shown in Fig. 24 to that shown in Fig. 25 the cutter, with the gage-roll $k^8$, is given a movement by the action of the cam $k^{26}$ upon the arm $k^7$ to the right of the said arc $x x$ in order to obviate the tendency of the cutter to leave the edge of the form at this point, as heretofore mentioned.

In Fig. 26 the form has made nearly one-half a rotation and the cutter has begun its movement toward the left to avoid being caught back of the pattern at the shank portion. In Fig. 27 the form has made one-half of a rotation and the cutter has completed its second independent movement to the left of the arc $x x$, the same as in Fig. 23, but on the opposite side of the form. In Figs. 28 and 29 the positions and movement of the cutter are similar to those shown in Figs. 24 and 25, but illustrating the relative positions of the cutter and form as the toe portions pass the cutter. In Fig. 30 the form has made a complete rotation and has stopped. In Fig. 31 the cutter is shown inside or to the left of the arc $x x$. This movement of the knife to the left severs any portion of the material which may project beyond the true outline of a completed sole at the point where the knife entered the blank at the beginning of the cutting operation. Thus, while the form makes one complete rotation past the knife, the knife makes three independent movements opposite to and two in the same direction as the motion of the edge of the rotating form, thereby overcoming the difficulties which would otherwise be experienced in cutting around the heel and toe and shank portions and by the final movement of the knife after the form has stopped, insuring a perfect sole.

In Fig. 32 the cutter is shown drawn back from the form in such a manner as to tighten the scrap around the sole, so that when the sole and scrap are removed from the form, as hereinafter described, there will be no tendency for the scrap to fall off on the side opposite to the cutter and thus become entangled with the form or the arm H which carries it. The sole having been cut, as described, the arm H starts back to receive another blank, the clamp is raised, Fig. 39, and as the arm H moves toward the shears the blank and sole are pushed off from the form by the fingers $l^7$, Figs. 33 and 34, the forward ends of which are roughened at $l' l'$ and bent to a horizontal position at right angles to the portions $l^2$, which latter portions enter holes in the sockets $l^3$, where they are secured by a set-screw in each. The sockets $l^3 l^3$ are secured by set-screws to the rock-shaft $l^4$, which has bearings at $l^5$ $l^5$ in the frame of the machine and is actuated at the proper time to throw the fingers $l$ $l$ down upon the sole by an arm $l^6$ and a projection $l^7$ on the cam $h^9$. A spring $l^8$ keeps the fingers raised to the position shown in dotted lines, Fig. 35, so that the clamp passes under the fingers, Fig. 37, the shaft $g'$ of the clamp $g$ passing through the space between the ends $l'$ $l'$ of the fingers $l$ $l$. It will be observed that the fingers $l$ $l$ are adjustable toward and from each other upon the shaft $l^4$, also toward and from the upper surface of the form, by turning the sockets $l^3$ $l^3$ upon the rock-shaft $l^4$, and are also adjustable toward and from the shears by moving the arms $l^2$ in or out of the sockets $l^3$. The rotation of the form $h$ and clamp $g$ occurs during the time when the sole is being cut, but while the form is receiving the blank and the arm H is carrying them with the blank from the shears to the cutter and returning for another blank the form and clamp do not rotate. This intermittent rotation of the clamp and form is effected by the connection of their respective shafts $g'$ $h'$ with the shaft $i$ through the bevel-gearing previously described.

The mechanism by which the shaft $i$ is intermittently rotated is best illustrated in Figs. 40 and 41, in which $b$ is the vertical cam-shaft, having fastened thereon the segmental gear $b^3$, which meshes another segmental gear $b^4$, the latter being fastened by screws to the spur-gear $b^5$, which meshes the intermediate gear $b^6$, and this in turn meshes the gear $b^7$, secured to the vertical driving-shaft $i$. The gears $b^3$ and $b^4$ rotate upon a stud $b^8$ and the gear $b^6$ on a stud $b^9$, both studs being fast to the frame A. The diameter of the gear $b^3$ is about twice the diameter of the gear $b^4$, the number of teeth on $b^3$ being equal to the number of spaces between the teeth on $b^4$, so that the gear $b^4$ will make one rotation while the gear $b^3$ on shaft $b$ is making about one-half a rotation. During the time that the segment-gearing is in mesh the form and clamp are rotated thereby through the train of gears connecting the shaft of each with the shaft $i$, and the sole is at that time being cut. When the segment-gears are out of mesh, as seen in Fig. 40, the smooth portion of the periphery on gear $b^3$ moves past the smooth portion on the gear $b^4$ without rotating the latter. The smooth portion of the periphery of gear $b^4$ is a concave curve, which fits the convex curve of the smooth portion of the periphery of the gear $b^3$, thus serving as a lock, which prevents the gear $b^4$ from rotating. During this last-named period the form and clamp are not rotating, and the arm H is swung from the cutter to the shears and back, as described.

We claim—

1. In a sole-cutting machine, intermittently-acting feeding mechanism; a device to control and regulate the extent of each of such actions upon the material being fed; intermediate mechanism operatively connected with said controlling device, and adapted to be acted upon by irregularities on said material; a series of projections upon the material, each of which, through said intermediate mechanism, sets the controlling device during one feeding action and thus determines the extent of the next.

2. In a sole-cutting machine, intermittently-operating feeding mechanism, the limit of whose forward movements is always at the same point, a regulating device to determine the beginning of each of said movements, projections upon the material which is being fed, mechanism connected with said regulating device, which is adapted to be acted upon by said projections, through which mechanism each advancing projection will set the regulating device and determine the beginning of the next succeeding feeding movement.

3. In a sole-cutting machine, the combination of a feed-roll, mechanism to intermittently engage and turn said roll, a device to regulate the period of engagement between the feed-roll and its actuating mechanism, projections upon the material which is fed, a pendent finger in the path of movement of such projections and adapted to be operated thereby, intermediate connections between said finger and regulating device, to produce correspondence in time and extent of their movement, and a clamp to hold the regulating device in a fixed position while the feed-actuating mechanism is controlled thereby.

4. In a sole-cutting machine the combination of a feed-roll, a pendent finger, with its free end normally near the surface of the material, and in its path of movement, mechanism to intermittently engage and turn the feed-roll an automatically-predetermined distance, a pendent arm connected at its lower end with a device to regulate the extent of each intermittent engagement and operation of the feeding mechanism, projections upon the material which is being fed, to strike and swing the free end of the pendent finger, a rocking shaft to which, both the pendent finger and the pendent arm are attached, whereby the movement of the finger by the projections will set the regulating device and determine each successive movement of the feed-rolls.

5. In a sole-cutting machine, the combination of intermittent feeding mechanism, a device to regulate the extent of each intermittent movement thereof, a series of projections upon the material being fed, a pivoted arm, operatively connected with said regulating device, and located in the path of movement of said projections and adapted to be acted upon thereby, and means to remove said arm out of the path of movement of said projections, at the beginning of each intermittent feeding operation.

6. In a sole-cutting machine, intermittently-operating feeding mechanism, a device to regulate the beginning of each of such operations, a pendent finger operatively connected with the regulating device, and located in the path of movement of the material which is being fed, projections upon the said material adapted to swing forward the free end of said finger and set the regulating device, and a spring to return the finger to its normal position when released from each projection.

7. In a machine for cutting articles of curvilinear outline from sheet material, the combination of a feed-roll, a ratchet connected therewith, mechanism to intermittently rotate the ratchet, an adjustable shield which covers a portion of said ratchet to regulate the operation thereon of the rotating mechanism, projections upon the material which is being fed, and devices to adjust the position of said shield in relation to the ratchet, which devices are adapted to be actuated by said projections when the material is advanced.

8. In a machine for cutting articles of curvilinear outline from sheet material, upon which ornamental or designating figures are regularly located, a roll to feed the material, mechanism to intermittently engage said roll and rotate it through a limited arc, a device to regulate the point at which the rotating mechanism shall engage said roll and means to automatically adjust the said regulating device according to the distances between successive figures on the material, which means are actuated by projections correspondingly located on the material which is being fed.

9. In a machine for cutting articles from strips of sheet material, a reciprocating guide or strip-adjuster, adapted to engage the strip and move it a prescribed distance transversely thereof at each movement of the guide in the same direction.

10. In a machine for cutting articles from strips of sheet material, a hinged arm carrying a friction-roll at its free end which is arranged to engage a perpendicular edge of said strip, a pivoted support for the hinged end of said arm, means to move it forward a prescribed distance against said strip and a spring to draw it backward to its normal position.

11. In a machine for cutting articles from strips of sheet material, a feed-roll and a bearing-roll adapted to be raised from contact therewith, a device to adjust the strip of material to a prescribed position in the machine, mechanism connected with said bearing-roll, to cause said adjusting device to act upon the material when the bearing-roll is raised and a spring to withdraw it from action when the bearing-roll is lowered.

12. In a sole-cutting machine, organized with a lower feeding-roll and an upper bearing-roll between which the material is fed, a guide or strip-adjuster consisting of an arm, one end of which is pivoted to a spring-controlled swinging support, the outer end of which arm is arranged to bear against a perpendicular edge of the material, pivoted supports for said bearing-roll, which supports act upon said guide-arm and move it transversely of the strip of material when the bearing-roll is raised, and release the arm and permit it to be drawn back by its controlling-spring when the bearing-roll is lowered.

13. In a machine for cutting articles by pattern from sheet material, a pattern to support the blank, a clamp of similar outline to hold the blank firmly upon the pattern, automatic intermittently-acting mechanism to force together and to separate the clamp and pattern, driving mechanism to rotate them simultaneously, a trimming-knife supported by an independent swiveling carrier provided with a pair of antifriction-bearings which make contact with the edge of the clamp and a spring to force said bearings against the clamp during the cutting operation and automatically adjust the knife with the plane of its cutting-blade tangent to the varying curves of the clamp, as said bearings pass over those curves, when the clamp and pattern are revolved to force the material against its cutting edge.

14. In a machine for cutting articles by pattern from sheet material, a support for the material and a clamp to hold the material firmly thereon, which clamp is provided with a laterally and downwardly projecting bearing edge, beveled upon its upper side at an angle corresponding to that desired for the bevel of the edge of the article to be cut.

15. In a machine for cutting articles by pattern from sheet material, a pair of intermittently-rotating blank-holding patterns supported in a pivoted frame, mechanism to swing said frame to and fro upon its pivot, a swiveling knife-carrier supported by an arm, which gives it limited movement toward and from the cutting-shears and to and fro longitudinal thereof, a spring-pressed sliding knife-adjusting plate having antifrictional bearings upon opposite sides of the knife-carrier swivel, when in contact with the pattern, and a trimming-knife attached to said carrier with the middle of its cutting-blade in the axial line of the carrier-swivel, and the plane of the shank thereof at right angles to the line of sliding movement of the adjusting-plate.

16. In a machine for cutting articles by pattern from sheet material, rotating blank-holding patterns, a cutter held in a carrier pivoted to the free end of a swinging arm having in addition, limited longitudinal reciprocation, mechanism to hold the carrier in contact with the clamping-pattern with yielding pressure, self-adjusting devices to automatically present the cutter to the pattern with the plane of the blade always tangent to the successively-approaching curves thereof when cutting an article, and antifriction-bearings between the said carrier and pattern and between the said carrier and its support upon said arm.

17. In a machine for cutting articles by pattern from sheet material upon which are formed at intervals, ornamental or designating figures, intermittently-operating feeding mechanism, devices to regulate the extent of each intermittent feeding movement, projections carried by the material, each of which acts upon the regulating devices, and sets them to give the next succeeding feeding operation an extent of movement equal to the distance between such projection and the one preceding, a rotating blank-holding support upon which the material is fed and a rotating clamping-pattern according to which the article is cut, blank-cutting shears and independently-supported cutting mechanism adapted to trim the material to the shape of said clamping-pattern.

18. In a machine for cutting articles by pattern from sheet material, having intermittently-operating feeding mechanism, blank-cutting shears and trimming-knife, a pair of blank-holding patterns, mechanism to force them together and thereby hold the blank while the article is being cut and to separate them while the article is being removed, means to periodically reciprocate the patterns between the cutting-shears and trimming-knife, and pattern-clearing devices, adapted to be moved into contact with the article which has been cut when the patterns are separated and are moved toward the shears, thereby clearing the lower pattern, and to be moved out of the path of the patterns when they are together and are carried from the shears.

CHAS. S. GOODING.
VICTOR BEAUREGARD.

Witnesses:
R. L. ROBERTS,
THOMAS J. CUNNINGHAM.